US008682076B2

(12) United States Patent
Cowburn et al.

(10) Patent No.: US 8,682,076 B2
(45) Date of Patent: Mar. 25, 2014

(54) SIGNATURE GENERATION FOR USE IN AUTHENTICATION AND VERIFICATION USING A NON-COHERENT RADIATION SOURCE

(75) Inventors: Russell Paul Cowburn, London (GB); Peter Seem, London (GB)

(73) Assignee: Ingenia Holdings Limited, Road Town (VG)

( * ) Notice: Subject to any disclaimer, the term of this patent is extended or adjusted under 35 U.S.C. 154(b) by 380 days.

(21) Appl. No.: 12/642,281

(22) Filed: Dec. 18, 2009

(65) Prior Publication Data

US 2010/0158377 A1 Jun. 24, 2010

Related U.S. Application Data

(60) Provisional application No. 61/139,380, filed on Dec. 19, 2008.

(30) Foreign Application Priority Data

Dec. 19, 2008 (GB) .................................. 0823327.2

(51) Int. Cl.
*G06K 9/00* (2006.01)
*A61N 5/00* (2006.01)

(52) U.S. Cl.
USPC ......................... 382/181; 382/119; 250/492.1

(58) Field of Classification Search
CPC ..................................................... G06K 9/00
USPC ......... 382/181, 119, 116, 115, 149, 141, 142, 382/143, 144, 145, 238, 118; 250/492.1, 250/492.3, 559.16, 559.18; 345/173; 235/435, 439, 454, 470, 462.11, 235/462.14; 257/35, E39.014; 427/526; 430/5; 340/5.86; 358/448
See application file for complete search history.

(56) References Cited

U.S. PATENT DOCUMENTS 3,877,019 A 4/1975 Auerbach et al.
4,525,748 A 6/1985 Carbone
(Continued)

FOREIGN PATENT DOCUMENTS

CA 2292594 12/1998
DE 10234431 2/2004
(Continued)

OTHER PUBLICATIONS d'Agraives et al., "Surface Topography, A Remarkable Method for the Identification of Seals of Structures in General," Commission of the European Communities Joint Research Centre—Ispra Establishment I-21020 Ispra (Va), Italy, pp. 403-409.
(Continued)

*Primary Examiner* — Sheela Chawan
(74) *Attorney, Agent, or Firm* — McDonnell Boehnen Hulbert & Berghoff LLP

(57) ABSTRACT

The present invention can provide an apparatus operable to determine a signature from an article arranged in a reading volume. The apparatus can comprise a generator operable to generate and sequentially direct a focussed noncoherent beam onto each of a plurality of different regions of the reading volume; a detector arrangement operable to collect a set comprising groups of data points from signals obtained when the beam scatters from the different regions of the reading volume, wherein different ones of the groups of data points relate to scatter from the respective different regions of the reading volume; and a data acquisition and processing module operable to determine a signature of the article from the set of groups of data points.

21 Claims, 25 Drawing Sheets

(56) References Cited

U.S. PATENT DOCUMENTS

| | | |
|---|---|---|
| 4,537,504 A | 8/1985 | Baltes et al. |
| 4,582,986 A | 4/1986 | Stockburger et al. |
| 4,754,487 A | 6/1988 | Newmuis |
| 4,791,669 A | 12/1988 | Kage |
| 4,797,921 A | 1/1989 | Shiraishi |
| 4,882,764 A | 11/1989 | Reynolds et al. |
| 5,003,596 A | 3/1991 | Wood |
| 5,058,164 A | 10/1991 | Elmer et al. |
| 5,060,065 A * | 10/1991 | Wasserman .................. 348/131 |
| 5,081,675 A | 1/1992 | Kittirutsunetorn |
| 5,103,479 A | 4/1992 | Takaragi et al. |
| 5,120,126 A * | 6/1992 | Wertz et al. ..................... 356/71 |
| 5,258,605 A * | 11/1993 | Metlitsky et al. ........ 235/462.32 |
| 5,295,196 A | 3/1994 | Raterman et al. |
| 5,306,899 A | 4/1994 | Marom et al. |
| 5,475,694 A | 12/1995 | Ivanov et al. |
| 5,539,840 A | 7/1996 | Krtolica et al. |
| 5,781,708 A | 7/1998 | Austin et al. |
| 5,903,340 A | 5/1999 | Lawandy et al. |
| 5,974,150 A | 10/1999 | Kaish et al. |
| 6,193,156 B1 | 2/2001 | Han et al. |
| 6,246,061 B1 | 6/2001 | Ramsey et al. |
| 6,314,409 B2 | 11/2001 | Schneck et al. |
| 6,328,209 B1 | 12/2001 | O'Boyle |
| 6,360,001 B1 | 3/2002 | Berger et al. |
| 6,373,573 B1 | 4/2002 | Jung |
| 6,388,744 B1 | 5/2002 | Kubota et al. |
| 6,390,368 B1 | 5/2002 | Edwards |
| 6,466,329 B1 | 10/2002 | Mukai |
| 6,473,165 B1 | 10/2002 | Coombs et al. |
| 6,529,269 B1 | 3/2003 | Sugata |
| 6,560,355 B2 | 5/2003 | Graves et al. |
| 6,563,129 B1 | 5/2003 | Knobel |
| 6,584,214 B1 | 6/2003 | Pappu et al. |
| 6,603,874 B1 * | 8/2003 | Stern et al. ..................... 382/144 |
| 6,605,819 B2 | 8/2003 | Ross |
| 6,621,916 B1 | 9/2003 | Smith et al. |
| 6,741,360 B2 | 5/2004 | D'Agraives et al. |
| 6,760,472 B1 | 7/2004 | Takeda et al. |
| 6,779,720 B2 | 8/2004 | Lewis |
| 6,798,900 B1 | 9/2004 | Sugata |
| 6,850,147 B2 | 2/2005 | Prokoski et al. |
| 6,882,738 B2 | 4/2005 | Davis et al. |
| 6,885,977 B2 | 4/2005 | Gavra et al. |
| 6,902,111 B2 | 6/2005 | Han et al. |
| 6,928,552 B1 | 8/2005 | Mischenko et al. |
| 6,950,094 B2 | 9/2005 | Gordon et al. |
| 6,955,141 B2 | 10/2005 | Santanam et al. |
| 6,961,449 B2 | 11/2005 | Mil'shtein |
| 6,970,573 B2 | 11/2005 | Carr et al. |
| 6,977,791 B2 | 12/2005 | Zhu et al. |
| 7,002,675 B2 | 2/2006 | Macgibbon |
| 7,031,555 B2 | 4/2006 | Troyanker |
| 7,071,481 B2 | 7/2006 | Nekrasov et al. |
| 7,076,084 B2 | 7/2006 | Davis et al. |
| 7,077,332 B2 * | 7/2006 | Verschuur et al. ............. 235/492 |
| 7,080,041 B2 | 7/2006 | Nagel |
| 7,082,216 B2 | 7/2006 | Jones et al. |
| 7,089,420 B1 | 8/2006 | Durst et al. |
| 7,104,449 B2 | 9/2006 | Han et al. |
| 7,110,573 B2 | 9/2006 | Monk et al. |
| 7,111,321 B1 | 9/2006 | Watts, Jr. et al. |
| 7,119,662 B1 | 10/2006 | Horiguchi et al. |
| 7,143,949 B1 | 12/2006 | Hannigan |
| 7,152,047 B1 | 12/2006 | Nagel |
| 7,162,035 B1 | 1/2007 | Durst et al. |
| 7,164,810 B2 | 1/2007 | Schnee et al. |
| 7,170,391 B2 | 1/2007 | Lane et al. |
| 7,184,133 B2 | 2/2007 | Coombs et al. |
| 7,200,868 B2 | 4/2007 | Mattox et al. |
| 7,221,445 B2 | 5/2007 | Earthman et al. |
| 7,222,361 B2 | 5/2007 | Kemper |
| 7,251,347 B2 | 7/2007 | Smith |
| 7,268,923 B2 | 9/2007 | Schroath et al. |
| 7,277,183 B2 | 10/2007 | Deck |
| 7,318,048 B1 | 1/2008 | King |
| 7,333,629 B2 | 2/2008 | Patton et al. |
| 7,336,842 B2 | 2/2008 | Kondo |
| 7,346,184 B1 | 3/2008 | Carr et al. |
| 7,353,994 B2 | 4/2008 | Farrall et al. |
| 7,363,505 B2 | 4/2008 | Black |
| 7,389,420 B2 | 6/2008 | Tian |
| 7,389,530 B2 | 6/2008 | Raghunath et al. |
| 7,391,889 B2 | 6/2008 | Kim et al. |
| 7,394,573 B1 * | 7/2008 | Goldberg et al. ............. 358/3.28 |
| 7,497,379 B2 | 3/2009 | Chen |
| 7,506,365 B2 | 3/2009 | Hirano et al. |
| 7,567,349 B2 | 7/2009 | Tearney et al. |
| 7,577,844 B2 | 8/2009 | Kirovski |
| 7,599,927 B2 | 10/2009 | Lebrat |
| 7,599,963 B2 | 10/2009 | Fernandez |
| 7,602,904 B2 | 10/2009 | Juels et al. |
| 7,605,940 B2 | 10/2009 | Silverbrook et al. |
| 7,647,279 B2 | 1/2010 | Bourrieres et al. |
| 7,684,069 B2 | 3/2010 | Kashiwazaki |
| 7,716,297 B1 | 5/2010 | Wittel et al. |
| 7,773,749 B1 | 8/2010 | Durst et al. |
| 7,853,792 B2 | 12/2010 | Cowburn |
| 7,920,714 B2 | 4/2011 | O'Neil |
| 8,009,800 B2 | 8/2011 | Doyle et al. |
| 8,078,875 B2 | 12/2011 | Cowburn et al. |
| 8,171,567 B1 | 5/2012 | Fraser et al. |
| 8,270,603 B1 | 9/2012 | Durst et al. |
| 2002/0041787 A1 | 4/2002 | Thomas |
| 2002/0091555 A1 | 7/2002 | Leppink |
| 2002/0105654 A1 | 8/2002 | Goltsos |
| 2002/0111837 A1 | 8/2002 | Aupperle |
| 2002/0116329 A1 | 8/2002 | Serbetcioglu et al. |
| 2003/0002067 A1 | 1/2003 | Miyano |
| 2003/0012374 A1 | 1/2003 | Wu et al. |
| 2003/0018587 A1 | 1/2003 | Althoff et al. |
| 2003/0028494 A1 | 2/2003 | King et al. |
| 2003/0035539 A1 | 2/2003 | Thaxton |
| 2003/0118191 A1 | 6/2003 | Wang et al. |
| 2003/0156294 A1 * | 8/2003 | D'Agraives et al. .......... 356/450 |
| 2003/0178487 A1 | 9/2003 | Rogers |
| 2004/0016810 A1 | 1/2004 | Hori et al. |
| 2004/0031849 A1 | 2/2004 | Hori et al. |
| 2004/0059952 A1 | 3/2004 | Newport et al. |
| 2004/0101158 A1 | 5/2004 | Butler et al. |
| 2004/0155913 A1 | 8/2004 | Kosugi et al. |
| 2004/0199765 A1 | 10/2004 | Kohane et al. |
| 2005/0006472 A1 * | 1/2005 | Verschuur et al. ............. 235/451 |
| 2005/0044385 A1 | 2/2005 | Holdsworth |
| 2005/0060171 A1 | 3/2005 | Molnar |
| 2005/0101841 A9 | 5/2005 | Kaylor et al. |
| 2005/0108057 A1 | 5/2005 | Cohen et al. |
| 2005/0110978 A1 | 5/2005 | Potyrailo et al. |
| 2005/0135260 A1 | 6/2005 | Todd |
| 2005/0178841 A1 | 8/2005 | Jones et al. |
| 2005/0199723 A1 | 9/2005 | Lubow |
| 2006/0022059 A1 | 2/2006 | Juds |
| 2006/0102830 A1 | 5/2006 | Brill et al. |
| 2006/0104103 A1 | 5/2006 | Colineau et al. |
| 2006/0163504 A1 | 7/2006 | Fujimoto et al. |
| 2006/0166381 A1 | 7/2006 | Lange |
| 2006/0256959 A1 | 11/2006 | Hymes |
| 2006/0294583 A1 | 12/2006 | Cowburn et al. |
| 2007/0025619 A1 * | 2/2007 | Cowburn et al. .............. 382/190 |
| 2007/0027819 A1 | 2/2007 | Cowburn |
| 2007/0028093 A1 | 2/2007 | Cowburn et al. |
| 2007/0028107 A1 | 2/2007 | Cowburn et al. |
| 2007/0028108 A1 | 2/2007 | Cowburn et al. |
| 2007/0036470 A1 | 2/2007 | Piersol et al. |
| 2007/0053005 A1 | 3/2007 | Cowburn |
| 2007/0058037 A1 | 3/2007 | Bergeron et al. |
| 2007/0113076 A1 | 5/2007 | Cowburn et al. |
| 2007/0115497 A1 | 5/2007 | Cowburn |
| 2007/0136612 A1 | 6/2007 | Asano et al. |
| 2007/0153078 A1 | 7/2007 | Cowburn |
| 2007/0153269 A1 | 7/2007 | Wang et al. |
| 2007/0162961 A1 | 7/2007 | Tarrance et al. |
| 2007/0164729 A1 | 7/2007 | Cowburn et al. |
| 2007/0165208 A1 | 7/2007 | Cowburn et al. |

(56) References Cited

U.S. PATENT DOCUMENTS

| | | | |
|---|---|---|---|
| 2007/0188793 A1 | 8/2007 | Wakai | |
| 2007/0192850 A1* | 8/2007 | Cowburn | 726/20 |
| 2007/0199047 A1 | 8/2007 | Gibart et al. | |
| 2007/0253001 A1 | 11/2007 | Watanabe et al. | |
| 2007/0271456 A1 | 11/2007 | Ward et al. | |
| 2008/0002243 A1 | 1/2008 | Cowburn | |
| 2008/0016358 A1 | 1/2008 | Filreis et al. | |
| 2008/0044096 A1* | 2/2008 | Cowburn et al. | 382/238 |
| 2008/0051033 A1 | 2/2008 | Hymes | |
| 2008/0260199 A1 | 10/2008 | Cowburn et al. | |
| 2008/0294900 A1 | 11/2008 | Cowburn | |
| 2009/0016535 A1 | 1/2009 | Cowburn | |
| 2009/0083372 A1 | 3/2009 | Teppler | |
| 2009/0254991 A1 | 10/2009 | Boulanger et al. | |
| 2009/0283583 A1 | 11/2009 | Cowburn | |
| 2009/0290906 A1 | 11/2009 | Cowburn | |
| 2009/0303000 A1 | 12/2009 | Cowburn | |
| 2009/0307112 A1 | 12/2009 | Cowburn | |
| 2010/0007930 A1 | 1/2010 | Cowburn | |
| 2010/0008590 A1 | 1/2010 | Cowburn | |
| 2010/0141380 A1 | 6/2010 | Pishva | |
| 2010/0158377 A1 | 6/2010 | Cowburn et al. | |
| 2010/0277446 A1 | 11/2010 | Van Veenendaal | |

FOREIGN PATENT DOCUMENTS

| | | |
|---|---|---|
| EP | 0 161 181 | 11/1985 |
| EP | 0 378 198 | 7/1990 |
| EP | 0472192 | 2/1992 |
| EP | 1087348 | 3/2001 |
| EP | 1202225 | 5/2002 |
| EP | 1217589 | 6/2002 |
| EP | 1434161 | 6/2004 |
| EP | 1484719 | 12/2004 |
| EP | 1587030 | 10/2005 |
| FR | 2765014 | 12/1998 |
| GB | 2097979 | 11/1982 |
| GB | 2411954 | 9/2005 |
| GB | 2417707 | 3/2006 |
| GB | 2417707 | 8/2006 |
| GB | 2426100 | 11/2006 |
| GB | 2431759 | 5/2007 |
| GB | 2433632 | 6/2007 |
| GB | 2440386 | 1/2008 |
| JP | H02-10482 | 1/1990 |
| JP | 2183879 | 7/1990 |
| JP | H03-192523 | 8/1991 |
| JP | 04265847 | 9/1992 |
| JP | H05504220 | 7/1993 |
| JP | H06-301840 | 10/1994 |
| JP | H08-180189 | 7/1996 |
| JP | 09218910 | 8/1997 |
| JP | H10-063914 | 3/1998 |
| JP | 63255793 | 10/1998 |
| JP | 11339049 | 12/1999 |
| JP | 2000011230 | 1/2000 |
| JP | 2000293105 | 10/2000 |
| JP | 2001521658 | 11/2001 |
| JP | 2003228709 | 2/2002 |
| JP | 2002-092682 | 3/2002 |
| JP | 2004102562 | 4/2002 |
| JP | 2003509745 | 3/2003 |
| JP | 2003-141595 | 5/2003 |
| JP | 2003143388 | 5/2003 |
| JP | 2003534536 | 11/2003 |
| JP | 2004077954 | 3/2004 |
| JP | 2005038389 | 2/2005 |
| JP | 2005352854 | 12/2005 |
| JP | 2008523438 | 7/2010 |
| NL | 8002604 | 12/1981 |
| TW | 437229 | 5/2001 |
| TW | 570444 | 1/2004 |
| WO | 91/11778 | 8/1991 |
| WO | 91/19614 | 12/1991 |
| WO | 93/22745 | 11/1993 |
| WO | 95/24691 | 9/1995 |
| WO | 95/34018 | 12/1995 |
| WO | 96/36934 | 11/1996 |
| WO | 97/24699 | 7/1997 |
| WO | 99/13391 | 3/1999 |
| WO | 00/45344 | 8/2000 |
| WO | 00/46980 | 8/2000 |
| WO | 00/65541 | 11/2000 |
| WO | 01/18754 | 3/2001 |
| WO | 01/25024 | 4/2001 |
| WO | 01/43086 | 6/2001 |
| WO | 01/54077 | 7/2001 |
| WO | 01/86574 | 11/2001 |
| WO | 01/86589 | 11/2001 |
| WO | 01/91007 | 11/2001 |
| WO | 02/16112 | 2/2002 |
| WO | 02/16114 | 2/2002 |
| WO | 02/50790 | 6/2002 |
| WO | 03/087991 | 10/2003 |
| WO | 2004/025548 | 3/2004 |
| WO | 2004/025549 | 3/2004 |
| WO | 2004/057525 | 8/2004 |
| WO | 2004/070667 | 8/2004 |
| WO | 2004/097826 | 11/2004 |
| WO | 2004/109479 | 12/2004 |
| WO | 2005/004039 | 1/2005 |
| WO | 2005/004797 | 1/2005 |
| WO | 2005/027032 | 3/2005 |
| WO | 2005/029447 | 3/2005 |
| WO | 2005/088517 | 3/2005 |
| WO | 2005/048256 | 5/2005 |
| WO | 2005/078651 | 8/2005 |
| WO | 2005/080088 | 9/2005 |
| WO | 2005/086158 | 9/2005 |
| WO | 2005/088517 | 9/2005 |
| WO | 2005/088533 | 9/2005 |
| WO | 2005/122100 | 12/2005 |
| WO | 2006/016112 | 2/2006 |
| WO | 2006/016114 | 2/2006 |
| WO | 2006/021083 | 3/2006 |
| WO | 2006/132584 | 12/2006 |
| WO | 2007/012815 | 2/2007 |
| WO | 2007/012821 | 2/2007 |
| WO | 2007/028799 | 3/2007 |
| WO | 2007/071788 | 6/2007 |
| WO | 2007/072048 | 6/2007 |
| WO | 2007/080375 | 7/2007 |
| WO | 2007/111548 | 10/2007 |
| WO | 2007/144598 | 12/2007 |
| WO | 2009/141576 | 11/2009 |
| WO | 2010/004281 | 1/2010 |

OTHER PUBLICATIONS

Written Opinion for PCT/GB2007/000015 dated May 4, 2007.
International Search Report GB0720673.3 issued by UK Intellectual Property Office, Mar. 28, 2008.
International Search Report from International App. No. PCT/GB2005/000922 filed Mar. 9, 2005.
International Search Report for PCT/GB2007/002173 dated Sep. 19, 2007.
International Search Report for PCT/GB2009/001702 dated Oct. 23, 2009.
International Search Report for Great Britain Patent App. No. GB0607867.0 (Aug. 2006).
Kirovski, Darko, "Toward an Automated Verification of Certificates of Authenticity," pp. 160-169 (2004).
Kravolec, "Plastic tag makes foolproof ID," Technology Research News, Oct. 2, 2002.
Kvasnik et al., "Image recognition using surface scattered light in a coherent optical processor," Image Processing and its Applications, University of Manchester Institute of Science and Technology UK, pp. 361-364 (1992).
Pappu et al., "Physical one-way functions," Science, American Association for the Advancement of Science, vol. 297, No. 5589, pp. 2026-2030 (2002).

(56) References Cited

OTHER PUBLICATIONS

Ravikanth, Pappu Srinivasa. "Physical One-Way Functions," Mar. 2001.
Schneier B., "Applied Cryptography. Protocols, Algorithms, and Source Code in C, Passage," Applied Cryptography, 2nd Ed., John Wiley & Sons, Inc., New York, p. 197 (1996).
G.J. Simmons, A survey of information authentication, in <i>Contemporary Cryptology, The Science of Information Integrity </i>, pp. 379-419 IEEE Press (1992).
Smalley, Eric, "Plastic Tag makes foolproof ID," Technology Research News, Oct. 2, 2002.
Smith et al., "Microstructure Based Indicia," Laboratories Escher Group, pp. 1-5 (1999).
UK Search Report for GB0812772.2 dated Nov. 6, 2008.
UK Search Report for GB0812773 dated Mar. 2009.
UK Search Report for GB0812773 dated Nov. 2008.
Van Renesse R.L., "Optical inspection techniques for security instrumentation," Proceedings of SPIE—The International Society for Optical Engineering, Vo. 2659, pp. 159-167 (Mar. 1996).
Wilkes, Sally, "Fighting Fraud: Document Biometrics," Materials World, vol. 12, No. 12, pp. 29-30 (Dec. 2004).
Zhang D et al., "Shape-based image retrieval using generic Fourier descriptor," Signal Processing. Image Communication, Ellsevier Science Publishers, Amsterdam, NL 17(10):825-848 (Nov. 2002).
Zwick/Roell—Zwick Materials testing—the new direction in extension measurement—optiXtens.
Haist et al., "Optical detection of random features for high security applications," Optics Communications, 147:173-179 (1998).
Buchanan, James, "Fingerprinting Documents and Packaging," Nature, 436:475 (2005).
Anderson, R., "Security Engineering: a guide to building dependable distributed systems," Wiley, 251-253, 2001.
Anonymous, "Discs and paper get biometric identifiers," IEEE Review, vol. 50, No. 12, p. 23, (Dec. 2004).
Chen, Yuqun et al., "Certifying Authenticity via Fiber-Infused Paper," ACM SIG ecom Exchanges, 5(3):29-37 (2005).
Cowburn, Russell, "Nanotechnology-Security and Brand Protection Applications 01," Smart Brand and Product Protection Conference 2005, Apr. 8, 2005 to Apr. 9, 2005, pp. 1-4, London, UK.
Derrode S et al., "Robust and Efficient Fourier-Mellin Transform Approximations for Gray-Level Image Reconstruction and Complete Invariant Description," Computer Vision and Image Understanding, Academic Press, San Diego, CA, 83(1):57-78 (Jul. 2001).
El-Khamy S. E. et al., "The FBG stream cipher," Proceedings of the 24th Radio National Science Conference (NRSC 2007) IEEE Cairo, Egypt, pp. 1-8 (Mar. 2007).
International Search Report and Written Opinion for PCT/GB2008/002020 dated Jun. 16, 2009.
International Search Report for Great Britain Patent Application No. GB0711461.4 dated Sep. 21, 2007.
Huss G. et al., "Spatial filtering efficiency of single-mode optical fibers for stellar interferometry applications: phenomenological and numerical study," Optics Communications, North-Holland Publishing Co., Amsterdam, NL, 244:209-217 (Sep. 23, 2004).
Hao F. et al., "Combining crypto with biometrics effectively," IEEE Transactions on Computers IEEE USA, 55 (9):1081-1088 (Sep. 2006).
Agilent Technologies, "Agilent Data Sheet HEDS 1500," Agilent Technologies, www.digchip.com, 1999, 6 pages.
European Patent Office, Notice of Opposition for EP2374111, dated Nov. 4, 2013, 20 pages.
The International Bureau of WIPO, International Preliminary Report on Patentability and Written Opinion for PCT/GB2007/002173, dated Dec. 16, 2008, 7 pages.
Métois, Eric et al., "FiberFingerprint identification" In Proc. 3rd Workshop on Automatic Identification, Mar. 2002, pp. 147-154.

* cited by examiner

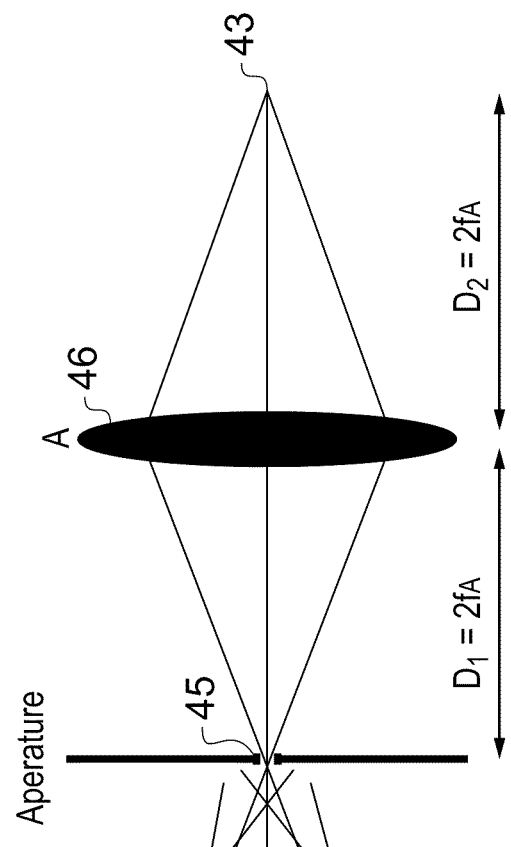
FIG. 3

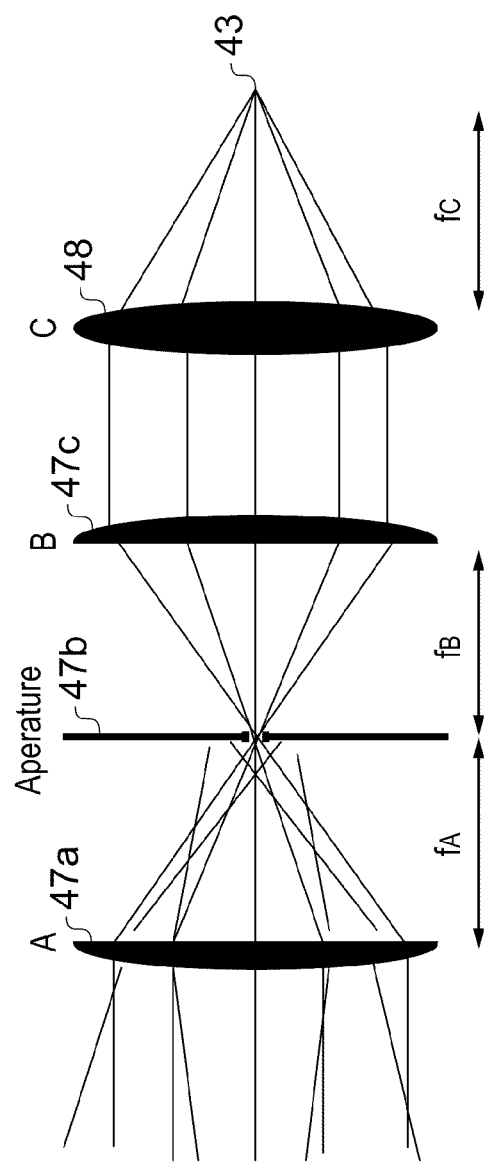
FIG. 4

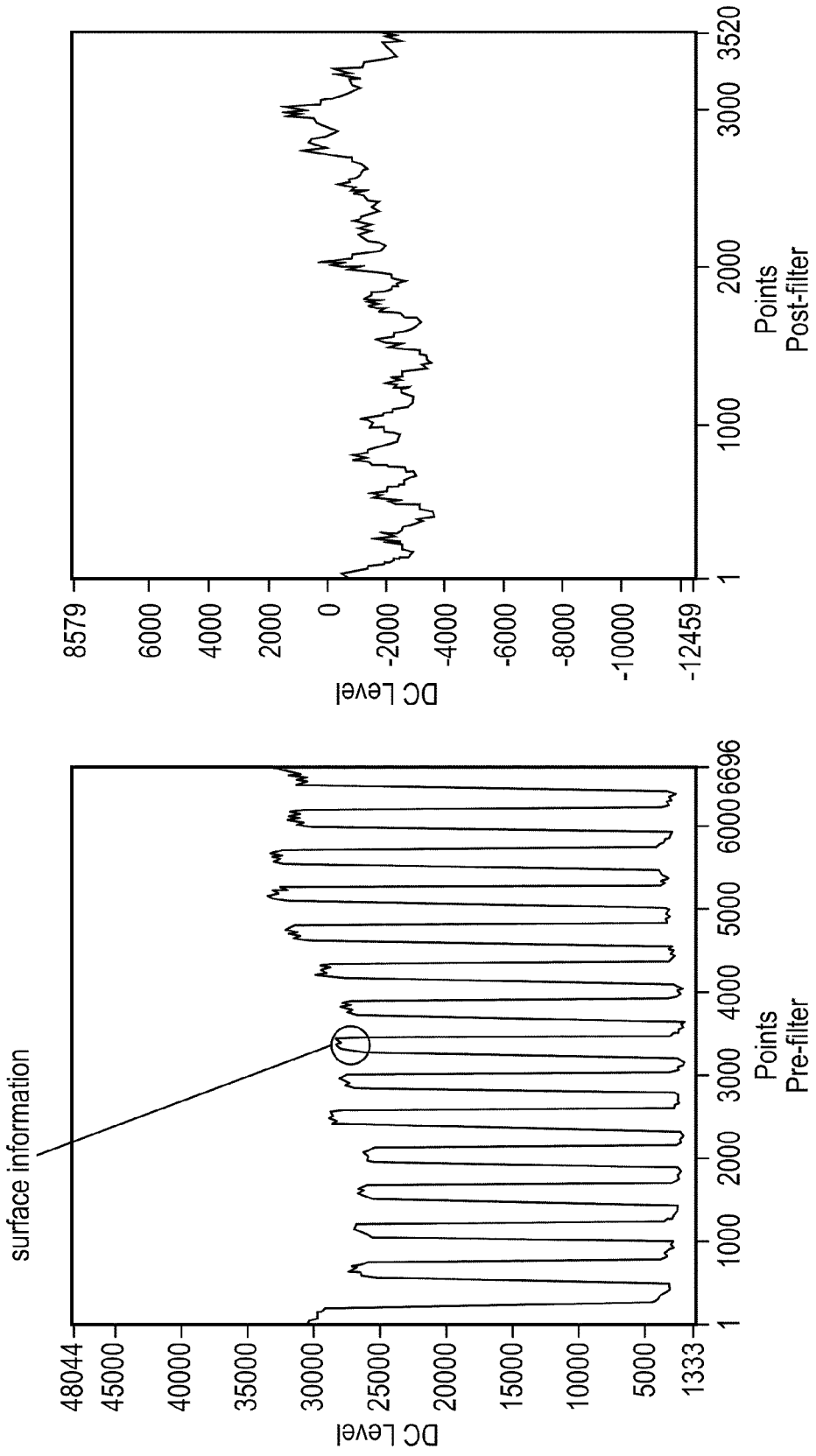

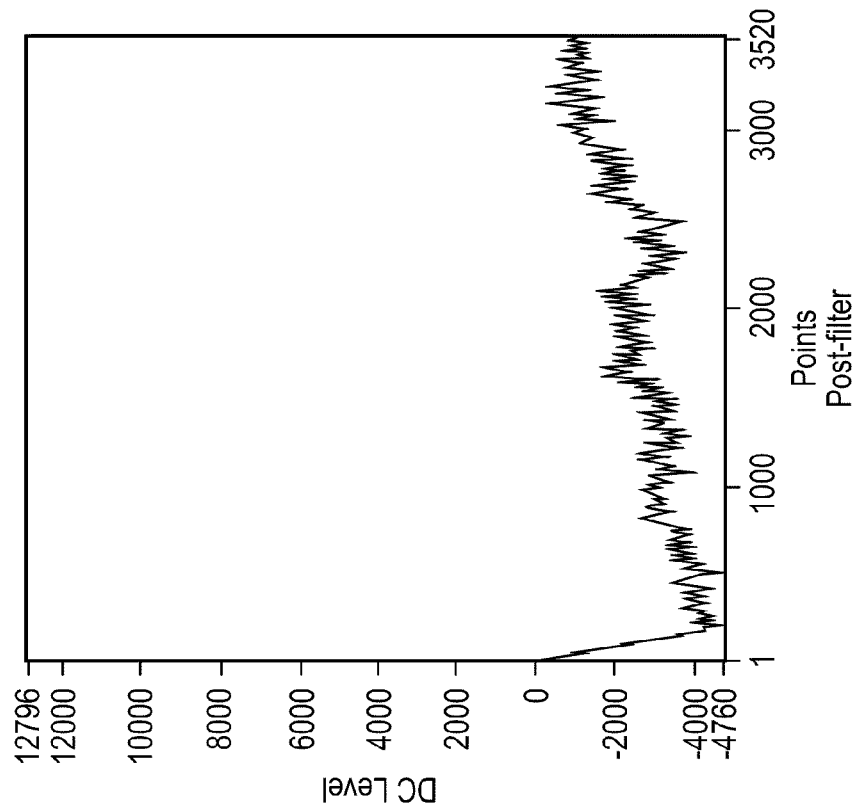
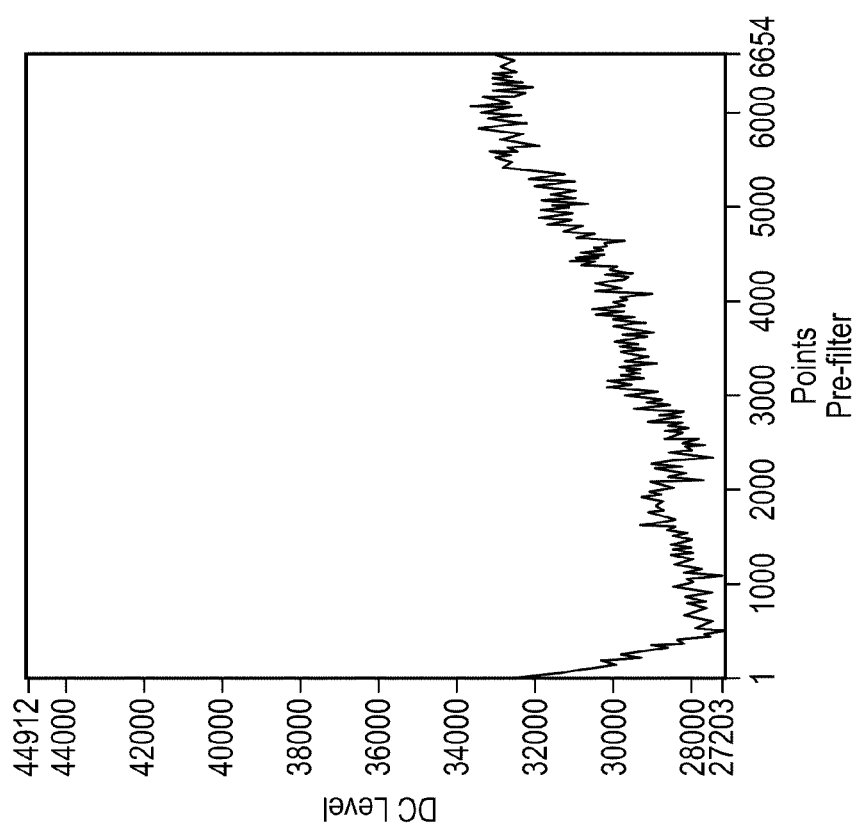
FIG. 14b
FIG. 14a

Structured LED source

Collimated laser source

Structured aperature, Thermal source

Structured aperature, LED source

SIGNATURE GENERATION FOR USE IN AUTHENTICATION AND VERIFICATION USING A NON-COHERENT RADIATION SOURCE

FIELD

The present invention relates to authentication and in particular, but not exclusively, to achieving a reliable and reproducible signature generation for use in authentication and verification using a non-coherent radiation source.

BACKGROUND

In the fields of authenticating of physical articles it is known to rely upon an identifier for the article. An identifier based on a physical property may be used, these can include embedded reflective particles (WO02/50790A1, U.S. Pat. No. 6,584,214) or an unmodified surface of the article (WO2005/088533). The inventor's previous work in this field has related to determining an identifier from an unmodified surface of an article by illuminating the surface with a coherent light beam. Others (WO2006/021083) have proposed the use of an LED source for presenting a stimulus to a target, both with a modified article and an unmodified article. However, the arrangements proposed in WO2006/021083 are extremely difficult to use to create a useful device with high authentication reliability.

To provide an authentication result based upon such an identifier, it is necessary to compare a reading from the article to be authenticated to a stored reading result. For this comparison, a match finding algorithm is used.

The present invention has been conceived in the light of known drawbacks of existing systems.

SUMMARY

Viewed from a first aspect, the present invention provides an apparatus for determining a signature from an article arranged in a reading volume. The apparatus comprises a generator operable to generate and sequentially direct a focussed noncoherent beam onto each of a plurality of different regions of the reading volume. The apparatus also comprises a detector arrangement operable to collect a set comprising groups of data points from signals obtained when the beam scatters from the different regions of the reading volume, wherein different ones of the groups of data points relate to scatter from the respective different regions of the reading volume; and a data acquisition and processing module operable to determine a signature of the article from the set of groups of data points. Thereby, a reliable, reproducible signature can be obtained for an article surface without the use of a laser illumination.

In some examples, the generator comprises a structured source such as an LED array. In other examples, the generator comprises an unstructured source such as a single LED, a fluorescent lamp or a thermal source such as a filament lamp. Thus a variety of different non-coherent illumination sources can be used.

In some examples the generator is operable to focus the beam to achieve an elongate focus into the reading volume. In some examples, the short dimension of the elongate focus is less than 100 µm. In other examples, the short dimension of the elongate focus is less than 50 µm. In some examples, the long dimension of the elongate focus is in the range 3 mm to 50 mm. Thus a scan of a relatively wide area of a target surface cyan be conducted with a single pass of a narrowly focussed beam.

In some examples, the generator comprises an arrangement for collimating the noncoherent beam and subsequently focussing the collimated beam. Thus the beam can be treated as a laser beam by subsequent focussing stages.

Viewed from another aspect, the present invention provides a method of determining a signature from an article arranged in a reading volume. The method comprises sequentially directing a focussed noncoherent beam onto each of a plurality of different regions of the reading volume. The method also comprises collecting a set comprising groups of data points from signals obtained when the beam scatters from the different regions of the reading volume, wherein different ones of the groups of data points relate to scatter from the respective different regions of the reading volume; and determining a signature of the article from the set of groups of data points. Thereby, a reliable, reproducible signature can be obtained for an article surface without the use of a laser illumination.

In some examples, the non-coherent beam is from a structured source such as an LED array. In some examples, the non-coherent beam is from an unstructured source such as a single LED, a fluorescent lamp or a thermal source such as a filament lamp. Thus a variety of different non-coherent illumination sources can be used.

In some examples, the method comprises focussing the beam to achieve an elongate focus into the reading volume. In some examples, the short dimension of the elongate focus is less than 100 µm. In other examples, the short dimension of the elongate focus is less than 50 µm. In some examples, the long dimension of the elongate focus is in the range 3 mm to 50 mm. Thus a scan of a relatively wide area of a target surface cyan be conducted with a single pass of a narrowly focussed beam.

In some examples, the method further comprises collimating the noncoherent beam and subsequently focussing the collimated beam. Thus the beam can be treated as a laser beam by subsequent focussing stages.

Further objects and advantages of the invention will become apparent from the following description and the appended claims.

BRIEF DESCRIPTION OF THE DRAWINGS

For a better understanding of the invention and to show how the same may be carried into effect reference is now made by way of example to the accompanying drawings in which:

FIG. 3 shows a schematic illustration of an unstructured light source arrangement;
FIG. 4 shows a schematic illustration of an unstructured light source arrangement.

FIGS. 13a and 13b show the effect of transition capping on data from a surface with a large number of high magnitude transitions;

FIGS. 14a and 14b show the effect of transition capping on data from a surface without high magnitude transitions;

Figure 1:
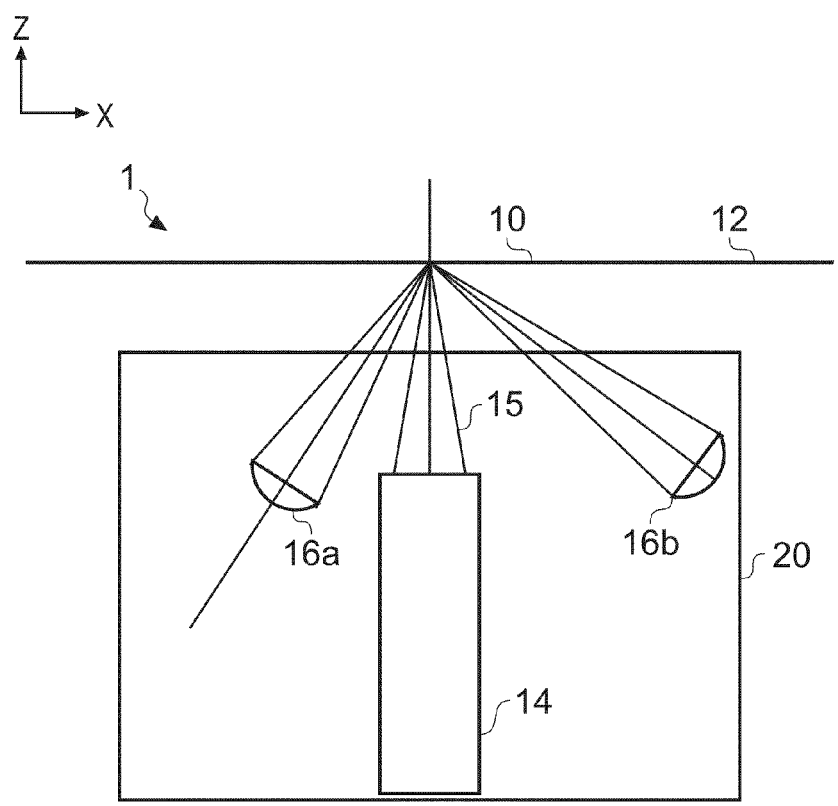
FIG. 1 shows a schematic side view of a reader apparatus.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

SPECIFIC DESCRIPTION

To provide an accurate method for uniquely identifying an article, it is possible to use a system which relies upon optical reflections from a surface of the article. An example of such a system will be described with reference to FIGS. 1 to 24.

The example system described herein is one developed and marketed by Ingenia Technologies Ltd. This system is operable to analyse the random surface patterning of a paper, cardboard, plastic or metal article, such as a sheet of paper, an identity card or passport, a security seal, a payment card etc to uniquely identify a given article. This system is described in detail in a number of published patent applications, including GB0405641.2 filed 12 Mar. 2004 (published as GB2411954 14 Sep. 2005), GB0418138.4 filed 13 Aug. 2004 (published as GB2417707 8 Mar. 2006), U.S. 60/601,464 filed 13 Aug. 2004, U.S. 60/601,463 filed 13 Aug. 2004, U.S. 60/610,075 filed 15 Sep. 2004, GB 0418178.0 filed 13 Aug. 2004 (published as GB2417074 15 Feb. 2006), U.S. 60/601,219 filed 13 Aug. 2004, GB 0418173.1 filed 13 Aug. 2004 (published as GB2417592 1 Mar. 2006), U.S. 60/601,500 filed 13 Aug. 2004, GB 0509635.9 filed 11 May 2005 (published as GB2426100 15 Nov. 2006), U.S. 60/679,892 filed 11 May 2005, GB 0515464.6 filed 27 Jul. 2005 (published as GB2428846 7 Feb. 2007), U.S. 60/702,746 filed 27 Jul. 2005, GB 0515461.2 filed 27 Jul. 2005 (published as GB2429096 14 Feb. 2007), U.S. 60/702,946 filed 27 Jul. 2005, GB 0515465.3 filed 27 Jul. 2005 (published as GB2429092 14 Feb. 2007), U.S. 60/702,897 filed 27 Jul. 2005, GB 0515463.8 filed 27 Jul. 2005 (published as GB2428948 7 Feb. 2007), U.S. 60/702,742 filed 27 Jul. 2005, GB 0515460.4 filed 27 Jul. 2005 (published as GB2429095 14 Feb. 2007), U.S. 60/702,732 filed 27 Jul. 2005, GB 0515462.0 filed 27 Jul. 2005 (published as GB2429097 14 Feb. 2007), U.S. 60/704,354 filed 27 Jul. 2005, GB 0518342.1 filed 8 Sep. 2005 (published as GB2429950 14 Mar. 2007), U.S. 60/715,044 filed 8 Sep. 2005, GB 0522037.1 filed 28 Oct. 2005 (published as GB2431759 2 May 2007), U.S. 60/731,531 filed 28 Oct. 2005, GB0526420.5 filed 23 Dec. 2005 (published as GB2433632 27 Jul. 2007), U.S. 60/753,685 filed 23 Dec. 2005, GB0526662.2 filed 23 Dec. 2005, U.S. 60/753,633 filed 23 Dec. 2005, GB0600828.8 filed 16 Jan. 2006 (published as GB2434442 25 Jul. 2007), U.S. 60/761,870 filed 25 Jan. 2006, GB0611618.0 filed 12 Jun. 2006 (published as GB2440386 30 Jan. 2008), U.S. 60/804,537 filed 12 Jun. 2006, GB0711461.4 filed 13 Jun. 2007 (published as GB2450131 17 Dec. 2008) and U.S. 60/943,801 filed 13 Jun. 2006 (all invented by Cowburn et al.), the content of each and all of which is hereby incorporated hereinto by reference.

As indicated the present invention has been developed in the context of the previous works of the inventor for Ingenia Technology Ltd. However, whereas much of the preceding work relates to the use of a laser source to illuminate a target, the present disclosure relates to use of a light source other than a laser source to illuminate a target surface and obtain a unique identifier thererfrom.

FIG. 1 shows a schematic side view of a reader apparatus 1. The optical reader apparatus 1 is for measuring a signature from an article (not shown) arranged in a reading volume of the apparatus. The reading volume is formed by a reading aperture 10 which is a slit in a housing 12. The housing 12 contains the main optical components of the apparatus. The slit has its major extent in the x direction (see inset axes in the drawing). The principal optical components are a light source 14 for generating a light beam 15 and a detector arrangement 16 made up of a plurality of k photodetector elements, where k=2 in this example, labelled 16a and 16b. In the illustrated example, the detector elements 16a, 16b are distributed either side of the beam axis offset at different angles from the beam axis to collect light scattered in reflection from an article present in the reading volume. In one example, the offset angles are ±45 degrees, in another example the angles are −30 and +50 degrees. The angles either side of the beam axis can be chosen so as not to be equal so that the data points they collect are as independent as possible. However, in practice, it has been determined that this is not essential to the operation and having detectors at equal angles either side of the incident beam is a perfectly workable arrangement. The detector elements are arranged in a common plane. The photodetector elements 16a and 16b detect light scattered from an article placed on the housing when the beam scatters from the reading volume. As illustrated, the source is mounted to direct the beam 15 with its beam axis in the z direction, so that it will strike an article in the reading aperture at normal incidence.

A number of examples of how a non-laser source can be arranged so as to provide a sufficiently tight of focus of the light beam 15 on the target surface are now described.

Figure 2:
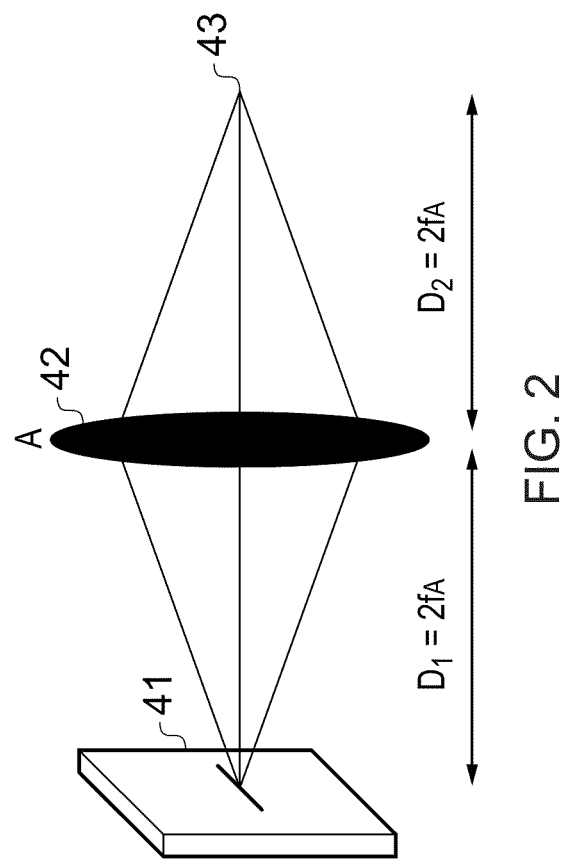
FIG. 2 shows a schematic illustration of a structured light source arrangement.

FIG. 2 shows an arrangement where the light source is a structured source. In this example, the structured source is a linear array of LEDs 41. The light from the linear array 41 is focussed by a focussing lens 42 to a target elongate or linear focal point 43. In the example illustrated, the optical arrangement is that the spacing between the array and the lens and the spacing between the lens and the target is twice the focal length of the lens. The general principle that applies to the distances is:

$$\frac{1}{D_1} + \frac{1}{D_2} = \frac{1}{f_A}$$

Where $f_A$ if the focal length of the lens and $D_1$ and $D_2$ are the respective distances between the lens and the source and the lens and the desired focal point.

In the Example of FIG. 2, the structured source is a linear LED array of 256 individual LED elements, each having dimensions of 15 μm by 22 μm and set at a 44 μm pitch. By using the optical arrangement in FIG. 2, a linear focus can be achieved where the width of the focussed line is less than 100 μm. The depth of focus is dependent upon the desired focus size and other factors including the effective numerical aperture. In the present example, a focal depth of the order of 500 μm can be straightforwardly achieved. Greater depth of focus may be achieved by altering the optical arrangements.

Other LED array sizes could also be used. If the length of the LED array does not correspond to the desired length of the linear focus on the target, the lens 43 can be arranged to extend the linear focus, or additional lens elements can be used to extend the linear focus.

FIG. 3 shows an arrangement with an unstructured light source such as a an LED, a filament lamp (thermal source) or fluorescent lamp 44. In this example, an aperture is used to "shape" the light emitted by the lamp 44 to enable a lens 46 to focus the light to a desired elongate or linear focal point. In the example illustrated, the optical arrangement is that the spacing between the array and the lens and the spacing between the lens and the target is twice the focal length of the lens. The general principle that applies to the distances is:

$$\frac{1}{D_1} + \frac{1}{D_2} = \frac{1}{f_A}$$

Where $f_A$ if the focal length of the lens and $D_1$ and $D_2$ are the respective distances between the lens and the source and the lens and the desired focal point.

In the Example of FIG. 3, the aperture has dimensions of 8 mm by 50 μm. By using the optical arrangement in FIG. 3, a linear focus can be achieved where the width of the focussed line is less than 100 μm. The depth of focus is dependent upon the desired focus size and other factors including the effective numerical aperture. In the present example, a focal depth of the order of 500 μm can be straightforwardly achieved. Greater depth of focus may be achieved by altering the optical arrangements.

Other aperture sizes could also be used. If the long axis of the aperture does not correspond to the desired length of the linear focus on the target, the lens 43 can be arranged to extend the linear focus, or additional lens elements can be used to extend the linear focus.

FIG. 4 shows an alternative arrangement for use of an unstructured source. In this example, the unstructured source is again a source such as an LED, a filament lamp (thermal source) or fluorescent lamp 44. The light emitted from the source 44 is them collimated by the arrangement of planoconvex lens 47a arranged to focus the light through an aperture 47b and then a second planoconvex lens 47c to achieve a collimated output. The spacing between the first lens 47a and the aperture is the focal length of the lens 47a, and the spacing between the aperture and the second lens 47c is the focal length of that lens. Once the collimated beam has been created by the arrangement 47, the collimated beam can be focussed by a focussing lens 48 in a similar manner to the way in which a collimated laser beam can be focussed. In the present example, the lens 48 provides focussing into the desired linear focus and as such a lens such as a cylindrical lens is used.

In the examples of FIGS. 3 and 4, the source can be an LED arranged other than as a structured array and may include more than one LED if required to achieve a given output intensity. In one example an LED emitting light in the red spectrum can be used. The source can alternatively be a filament lamp (incandescent lamp or thermal source) and may include more than one lamp if required to achieve a given output intensity. In one example a halogen lamp can be used. The source can also be a fluorescent lamp or gas discharge lamp and may include more than one lamp if required to achieve a given output intensity.

Referring again to FIG. 1, the light beam is focused by a focussing arrangement such as one of those discussed with reference to FIGS. 2, 3 and 4 into an elongate focus extending in the y direction (perpendicular to the plane of the drawing) and lying in the plane of the reading aperture. In one example reader, the elongate focus has a major axis dimension of about 5 mm and a minor axis dimension of about 40 micrometers. These optical components are contained in a subassembly 20.

Generally it is desirable that the depth of focus is large, so that any differences in the article positioning in the z direction do not result in significant changes in the size of the beam in the plane of the reading aperture. The parameters, of depth of focus, numerical aperture and working distance are interdependent, resulting in a well known trade off between spot size and depth of focus. In some arrangements, the focus may be adjustable and in conjunction with a rangefinding means the focus may be adjusted to target an article placed within an available focus range.

In order to enable a number of points on the target article to be read, the article and reader apparatus can be arranged so as to permit the incident beam and associated detectors to move relative to the target article. This can be arranged by moving the article, the scanner assembly or both. In some examples, the article may be held in place adjacent the reader apparatus housing and the scanner assembly may move within the reader apparatus to cause this movement. Alternatively, the article may be moved past the scanner assembly, for example in the case of a production line where an article moves past a fixed position scanner while the article travels along a conveyor. In other alternatives, both article and scanner may be kept stationary, while a directional focus means causes the noncoherent light beam to travel across the target. This may require the detectors to move with the light bean, or stationary detectors may be positioned so as to receive reflections from all incident positions of the light beam on the target.

Figure 5:
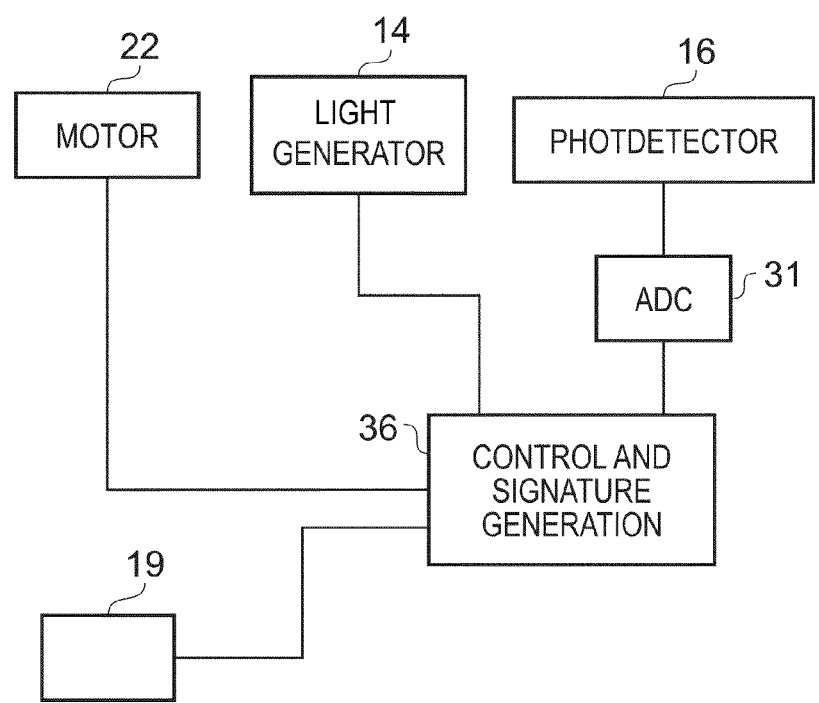
FIG. 5 shows a block schematic diagram of functional components of the reader apparatus.

FIG. 5 is a block schematic diagram of logical components of a reader apparatus as discussed above. A light generator 14 is controlled by a control and signature generation unit 36. Optionally, a motor 22 may also be controlled by the control and signature generation unit 36. Optionally, if some form of motion detection or linearization means (shown as 19) is implemented to measure motion of the target past the reader apparatus, and/or to measure and thus account for non-linearities in there relative movement, this can be controlled using the control and signature generation unit 36.

The reflections of the focussed beam from the target surface scan area are detected by the photodetector 16. As discussed above, more than one photodetector may be provided in some examples. The output from the photodetector 16 is digitised by an analog to digital converter (ADC) 31 before being passed to the control and signature generation unit 36 for processing to create a signature for a particular target surface scan area. The ADC can be part of a data capture circuit, or it can be a separate unit, or it can be integrated into a microcontroller or microprocessor of the control and signature generation unit 36.

The control and signature generation unit 36 can use the focussed beam present incidence location information to determine the scan area location for each set of photodetector reflection information. Thereby a signature based on all or selected parts of the scanned part of the scan area can be created. Where less than the entire scan area is being included in the signature, the signature generation unit 36 can simply ignore any data received from other parts of the scan area when generating the signature. Alternatively, where the data from the entire scan area is used for another purpose, such as positioning or gathering of image-type data from the target, the entire data set can be used by the control and signature generation unit 36 for that additional purpose and then kept or discarded following completion of that additional purpose.

As will be appreciated, the various logical elements depicted in FIG. 5 may be physically embodied in a variety of apparatus combinations. For example, in some situations, all of the elements may be included within a scan apparatus. In other situations, the scan apparatus may include only the light generator 14, motor 22 (if any) and photodetector 16 with all the remaining elements being located in a separate physical unit or units. Other combinations of physical distribution of the logical elements can also be used. Also, the control and signature generation unit 36 may be split into separate physical units. For example, the there may be a first unit which actually controls the light generator 14 and motor (if any), a second unit which calculates the focussed beam current incidence location information, a third unit which identifies the scan data which is to be used for generating a signature, and a fourth part which actually calculates the signature.

It will be appreciated that some or all of the processing steps carried out by the ADC 31 and/or control and signature generation unit 36 may be carried out using a dedicated processing arrangement such as an application specific integrated circuit (ASIC) or a dedicated analog processing circuit. Alternatively or in addition, some or all of the processing steps carried out by the beam ADC 31 and/or control and signature generation unit 36 may be carried out using a programmable processing apparatus such as a digital signal processor or multi-purpose processor such as may be used in a conventional personal computer, portable computer, handheld computer (e.g. a personal digital assistant or PDA) or a smartphone. Where a programmable processing apparatus is used, it will be understood that a software program or programs may be used to cause the programmable apparatus to carry out the desired functions. Such software programs may be embodied onto a carrier medium such as a magnetic or optical disc or onto a signal for transmission over a data communications channel.

Figure 6:
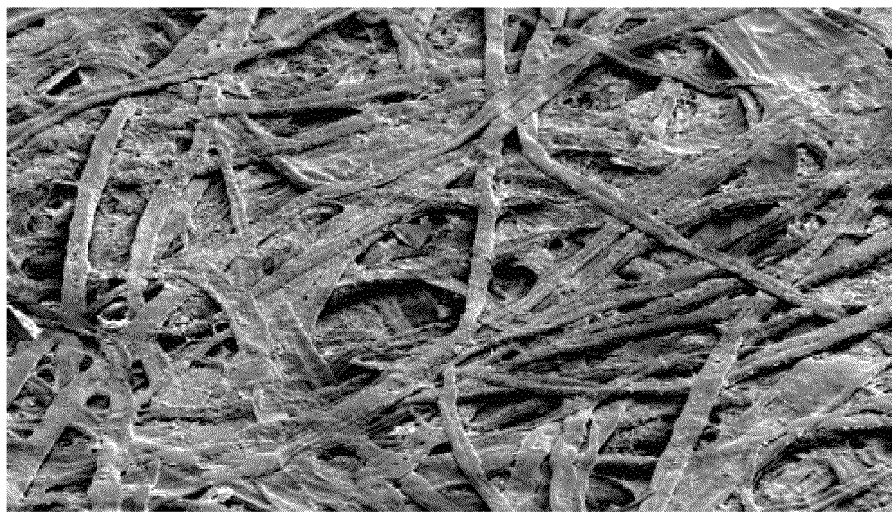
FIG. 6 is a microscope image of a paper surface.
Figure 7:
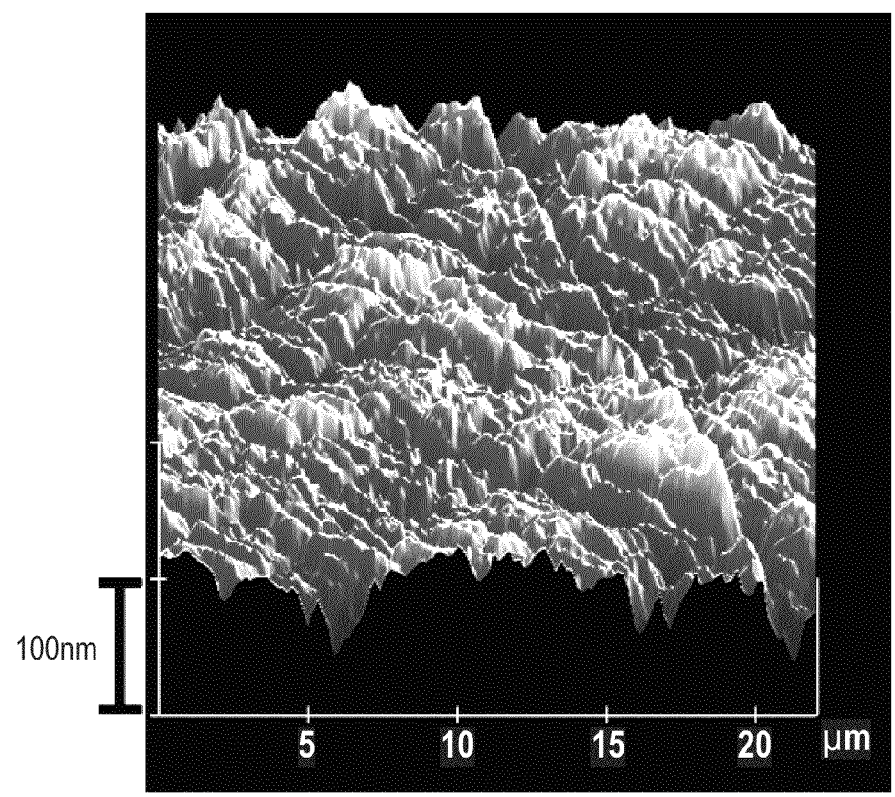
FIG. 7 shows an equivalent image for a plastic surface.

To illustrate the surface properties which the system of these examples can read, FIGS. 6 and 7 illustrate a paper and plastic article surface respectively.

FIG. 6 is a microscope image of a paper surface with the image covering an area of approximately 0.5×0.2 mm. This figure is included to illustrate that macroscopically flat surfaces, such as from paper, are in many cases highly structured at a microscopic scale. For paper, the surface is microscopically highly structured as a result of the intermeshed network of wood or other plant-derived fibres that make up paper. The figure is also illustrative of the characteristic length scale for the wood fibres which is around 10 microns. This dimension has the correct relationship to the optical wavelength of the noncoherent beam to cause diffraction and also diffuse scattering which has a profile that depends upon the fibre orientation. It will thus be appreciated that if a reader is to be designed for a specific class of goods, the wavelength of the light can be tailored to the structure feature size of the class of goods to be scanned. It is also evident from the figure that the local surface structure of each piece of paper will be unique in that it depends on how the individual wood fibres are arranged. A piece of paper is thus no different from a specially created token, such as the special resin tokens or magnetic material deposits of the prior art, in that it has structure which is unique as a result of it being made by a process governed by laws of nature. The same applies to many other types of article.

FIG. 7 shows an equivalent image for a plastic surface. This atomic force microscopy image clearly shows the uneven surface of the macroscopically smooth plastic surface. As can be surmised from the figure, this surface is smoother than the paper surface illustrated in FIG. 6, but even the fine levels of surface undulation on a variety of plastic surfaces can be uniquely identified using the signature generation scheme of the present examples.

In other words, it is essentially pointless to go to the effort and expense of making specially prepared tokens, when unique characteristics are measurable in a straightforward manner from a wide variety of every day articles. The data collection and numerical processing of a scatter signal that takes advantage of the natural structure of an article's surface (or interior in the case of transmission) is now described.

As is shown in FIG. 1 above, focussed light reflecting from a surface is collected by a number of detectors 16. The detectors receive reflected light across the area of the detector. The reflected light contains information about the surface at the position of incidence of the light. As discussed above, this information may include information about surface roughness of the surface on a microscopic level. This information is carried by the reflected light in the form of the wavelength of features in the observed pattern of reflected light. By detecting these wavelength features, a fingerprint or signature can be derived based on the surface structure of the surface. By measuring the reflections at a number of positions on the surface, the fingerprint or signature can be based on a large sample of the surface, thereby making it easier, following re-reading of the surface at a later date, to match the signature from the later reading to the signature from the initial reading.

The reflected light includes information at two main angular wavelength or angular frequency regions. The high angular frequency (short wavelength) information is that which is traditionally known as speckle. This high angular frequency component typically has an angular periodicity of the order of 0.5 degrees. There is also low angular frequency (long wavelength) information which typically has an angular periodicity of the order of 15 degrees.

As mentioned above, each photodetector collects reflected light over a solid angle which will be called $\theta_n$. It is assumed in the present discussion that each photodetector collects light over a square or circular area. The solid angle of light collection can vary between different photodetectors 16. Each photodetector 16 measures reflected light having a minimum angle from the surface which will be called $\theta_r$. Thus the light detected by a given photodetector 16 includes the reflected beams having an angle relative to the surface of between $\theta_r$ and $\theta_r + \theta_n$. As will be discussed in greater detail below, there can be advantages in making a system resistant to spoofing in having detector channels separated by the largest possible angle. This could lead to making the angle $\theta_r$ as small as possible.

As will be appreciated, the solid angle $\theta_n$ over which a photodetector 16 detects reflected light may also be represented as a Numerical Aperture (NA) where:

$$NA = \sin(\phi)$$

where $\phi$ is the half-angle of the maximum cone of light that can enter or exit the detector. Accordingly, the numerical aperture of the detectors in the present example is:

$$NA = \sin(\theta_n/2)$$

Thus, a photodetector having a large numerical aperture will have the potential to collect a greater amount of light (i.e. more photons), but this has the effect of averaging more of the reflected information (speckle) such that the sum of all captured information speckle is weaker. However, the long angular wavelength component is less affected by the averaging than the short angular wavelength (traditional speckle) component, so this has the effect of the improving ratio of long wavelength to short wavelength reflected signal.

Although it is shown in FIG. 1 that the focussed noncoherent beam is normally incident on the surface, it will be appreciated that in practice it can be difficult to ensure perfectly normal incidence. This is especially true in circumstances where a low cost reader is provided, where positioning is performed by a user with little or no training or where positioning of the article is out of control of a user, such as on commercial processing environment including, for example conveyors transporting articles, and any circumstance where the distance from the reader to the article is such that there is no physical contact between reader and article. Thus, in reality it is very likely that the incident focussed noncoherent light beam will not strike the article from a perfect normal.

Figure 8:
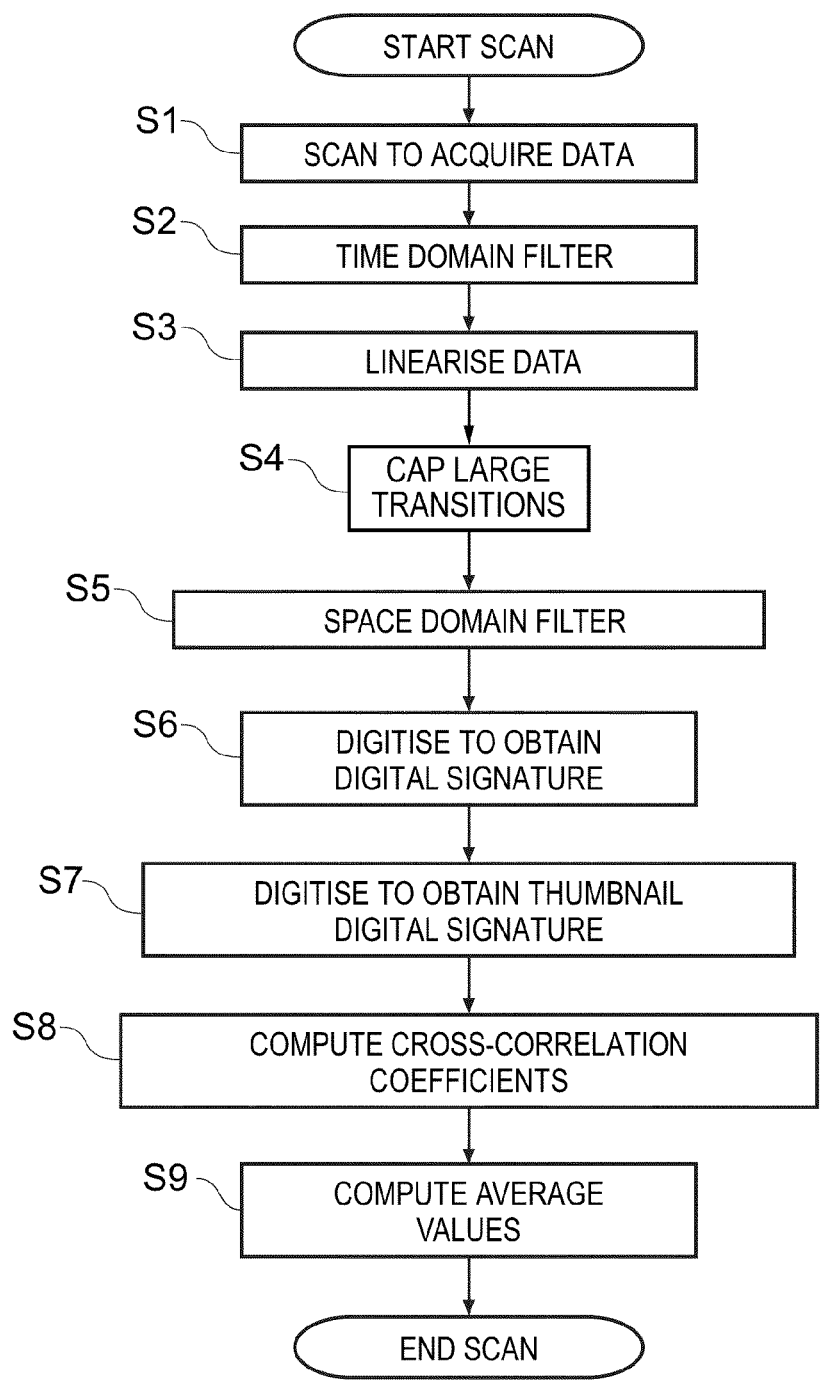
FIG. 8 shows a flow diagram showing how a signature of an article can be generated from a scan.

FIG. 8 shows a flow diagram showing how a signature of an article can be generated from a scan.

Step S1 is a data acquisition step during which the optical intensity at each of the photodetectors is acquired at a number of locations along the entire length of scan. Simultaneously, the encoder signal is acquired as a function of time. It is noted that if the scan motor has a high degree of linearisation accuracy (e.g. as would a stepper motor), or if non-linearities in the data can be removed through block-wise analysis or template matching, then linearisation of the data may not be required. Referring to FIG. 5 above, the data is acquired by the signature generator 36 taking data from the ADC 31. The number of data points per photodetector collected in each scan is defined as N in the following. Further, the value $a_k(i)$ is defined as the i-th stored intensity value from photodetector k, where i runs from 1 to N.

Step S2 is an optional step of applying a time-domain filter to the captured data. In the present example, this is used to selectively remove signals in the 50/60 Hz and 100/120 Hz bands such as might be expected to appear if the target is also subject to illumination from sources other than the focussed beam. These frequencies are those most commonly used for driving room lighting such as fluorescent lighting. Care should be taken if the illumination source for the scan is an unstructured source such as a filament lamp or fluorescent lamp not to exclude any AC frequencies necessary for powering the source.

Step S3 performs alignment of the data. In some examples, this step uses numerical interpolation to locally expand and contract $a_k(i)$ so that the encoder transitions are evenly spaced in time. This corrects for local variations in the motor speed and other non-linearities in the data. This step can be performed by the signature generator 36.

In some examples, where the scan area corresponds to a predetermined pattern template, the captured data can be compared to the known template and translational and/or rotational adjustments applied to the captured data to align the data to the template. Also, stretching and contracting adjustments may be applied to the captured data to align it to the template in circumstances where passage of the scan head relative to the article differs from that from which the template was constructed. Thus if the template is constructed using a linear scan speed, the scan data can be adjusted to match the template if the scan data was conducted with non-linearities of speed present.

Step S4 applies an optional signal intensity capping to address a particular issue which occurs with articles having, for example, highly printed surfaces, including surfaces with text printing and surfaces with halftone printing for example. The issue is that there is a tendency for the non-match results to experience an increase in match score thereby reducing the separation between a non-match result and a match result.

Figure 10:
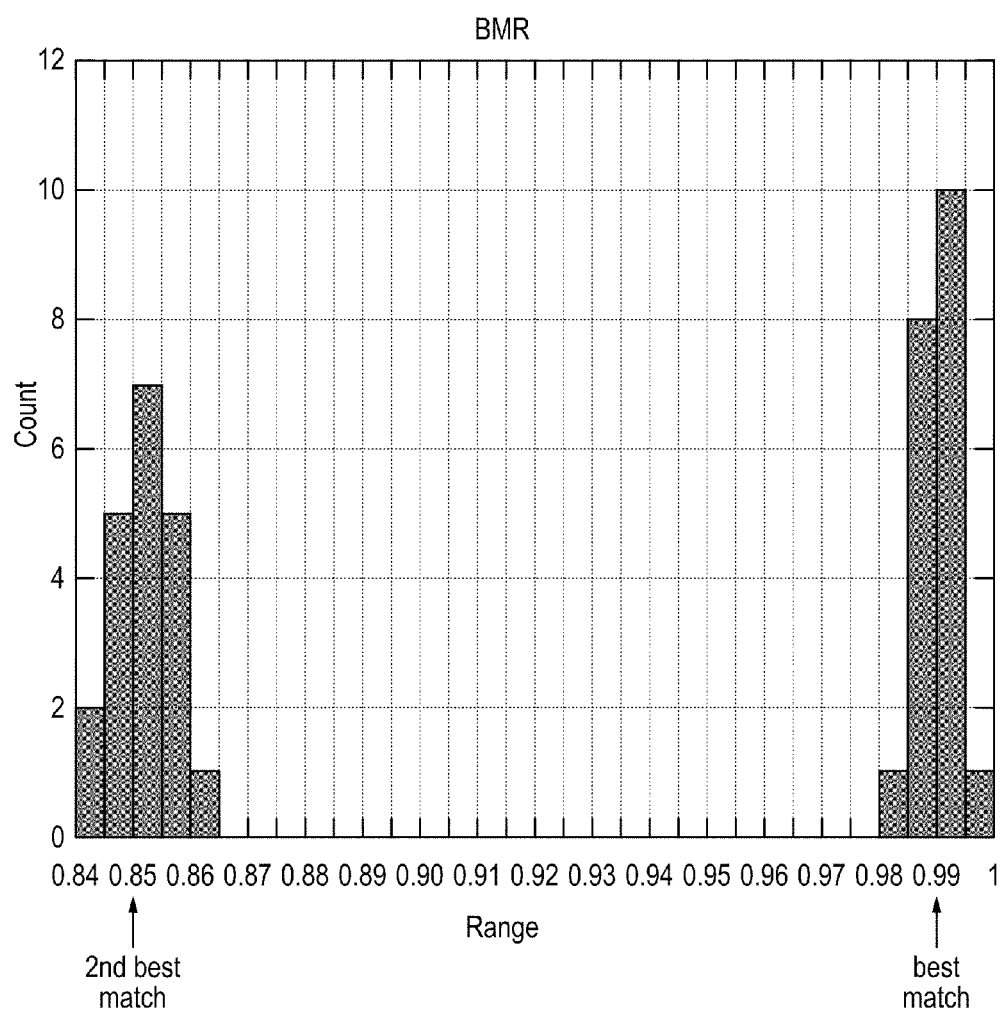
FIG. 10 shows schematically the effect of high contrast transitions on bit match ratios.

This is caused by the non-random effects of a sudden contrast change on the scanned surface in relation to the randomness of each bit of the resulting signature. In simple terms, the sudden contrast change causes a number of non-random data bits to enter the signature and these non-random bits therefore match one-another across scans of similarly printed or patterned articles. FIG. 10 illustrates this process in more detail.

Figure 9A:
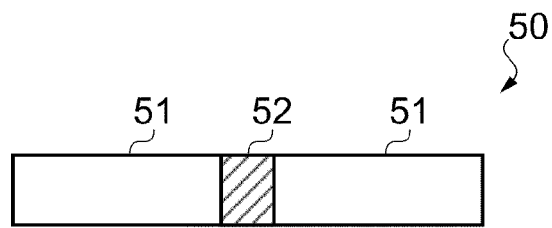
FIGS. 9a to 9c show schematically the effect of high contrast transitions on collected data.
Figure 9B:
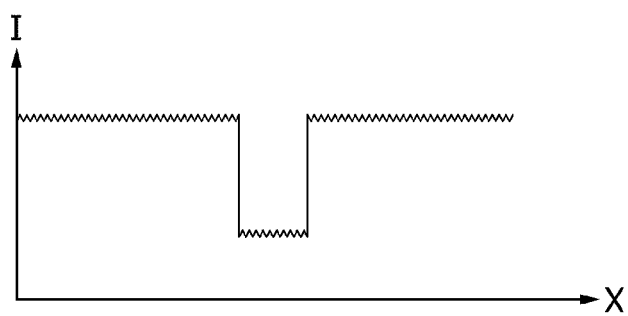

FIG. 9a shows a scan area 50 on an article, the scan area has two areas 51 which have a first surface colour and an area 52 with a second surface colour. The effect of this surface colour transition is shown in FIG. 9b where the intensity of the reflected signal captured by the scan apparatus is plotted along the length of the scan area. As can be seen, the intensity follows a first level when the first surface colour is present and a second level when the second surface colour is present. At each of the first and second levels, small variations in signal intensity occur. These small variations are the information content from which the signature is derived.

Figure 9C:
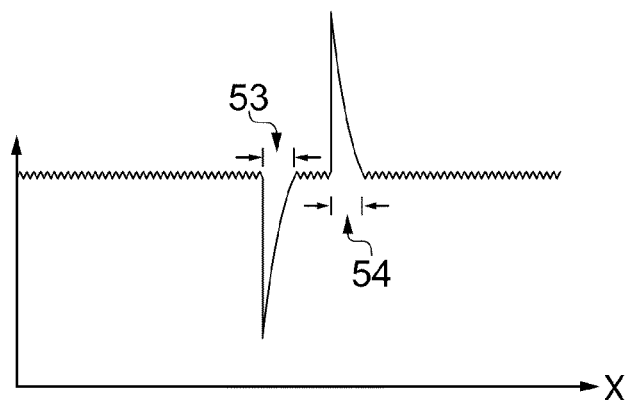

The problem that the step change between the first and second levels in FIG. 9b actually causes in the resulting signature is illustrated by FIG. 9c. FIG. 9c shows the intensity data from FIG. 9b after application of an AC filter (such as the space domain band-pass filter discussed below with respect to step S4). From FIG. 9c it is clear that, even with a high order filter such as a $2^{nd}$ order filter, after each sudden transition in surface pattern on the scan area a region where the small intensity variation is lost occurs. Thus, for each data bit position in the region 53, the value of the data bit that ends up in the signature will be a zero, irrespective of the small variations in intensity that actually occurred at those positions. Likewise, for each data bit position in the region 54, the value of the data bit that ends up in the signature will be a one, irrespective of the small variations in intensity that actually occurred at those positions.

As two similar articles can be expected to have nominally identical surface printing or patterning over a scan region, all signatures for such articles can be expected to have approximately the same regions of all one and/or all zero data bits within the signature at the positions corresponding to the step changes in the surface pattern/print/colour. These regions therefore cause an artificially increased comparison result value for comparisons between different articles, reducing the separation between a match result and a non-match result. This reduced separation is illustrated in FIG. 13, where it can be seen that the peak for comparisons between different scans of a single article (i.e. a match result) is centred at a bit match ratio of around 99%, whereas the peak for the second best match where a comparison is performed against scans of different articles is centred at a bit match ratio of around 85%. Under normal circumstances, where no such surface patterning effects occur, the non-match peak would be expected to be much closer to 50%.

As is noted above, a first approach to minimising the data loss caused by such transitions involves using a high order filter to minimise the recovery time and thus minimise the number of signature bits that are affected by each scan surface transition.

Figure 11A:
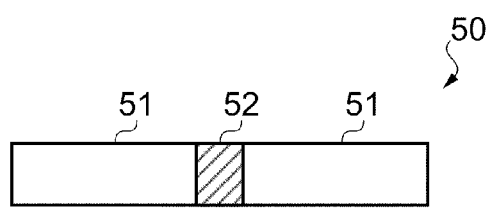
FIGS. 11a to 11c show schematically the mitigation of the effect of high contrast transitions on collected data by transition capping.
Figure 11B:
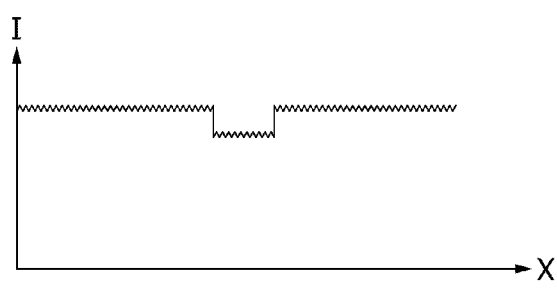
Figure 11C:
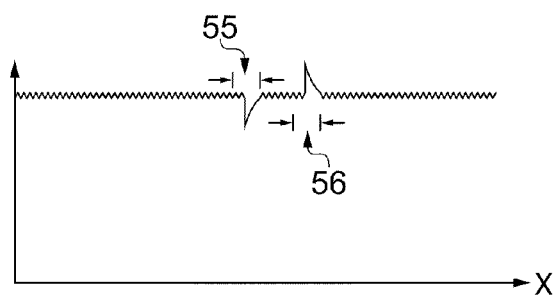

As will be described hereafter, a more involved approach can be taken to minimising the impact of such scan surface transitions on the bits of a signature derived from a scan of that scan surface. Specifically, a system can be implemented to detect that an intensity variation is occurring that is too large to be one of the small variations that represents the surface texture or roughness which leads to the signature. If such a transition is detected, the magnitude of the transition can be chopped or capped before the AC filter is applied to further reduce the filter recovery time. This is illustrated in FIG. 11. FIG. 11a is identical to FIG. 9a, and shows the scan region with the patterned areas. FIG. 11b shows the capped magnitude of the transitions between the patterned areas, and FIG. 11c shows that the regions 55 and 56 which result in all one and all zero data bits are much smaller relative to the corresponding regions 53 and 54 in FIG. 9c. This then reduces the number of bits in the signature which are forced to adopt a zero or one value as a direct result of a surface pattern transition without any reference to the small variations that the remainder of the signature is based upon.

One of the most straightforward ways to detect such transitions is to know when they are coming such as by having a template against which the scan data can be compared to cap the transitions automatically at certain points along the scan length. This approach has two drawbacks, that the template needs to be aligned to the scan data to allow for mispositioning of the scanner relative to the article, and that the scanner needs to know in advance what type of article is to be scanned so as to know what template to use.

Another way to detect such transitions is to use a calculation based on, for example, the standard deviation to spot large transitions. However, such a approach typically has trouble with long periods without a transition and can thus cause errors to be introduced where a scanned article doesn't have any/many transitions.

Figure 12:
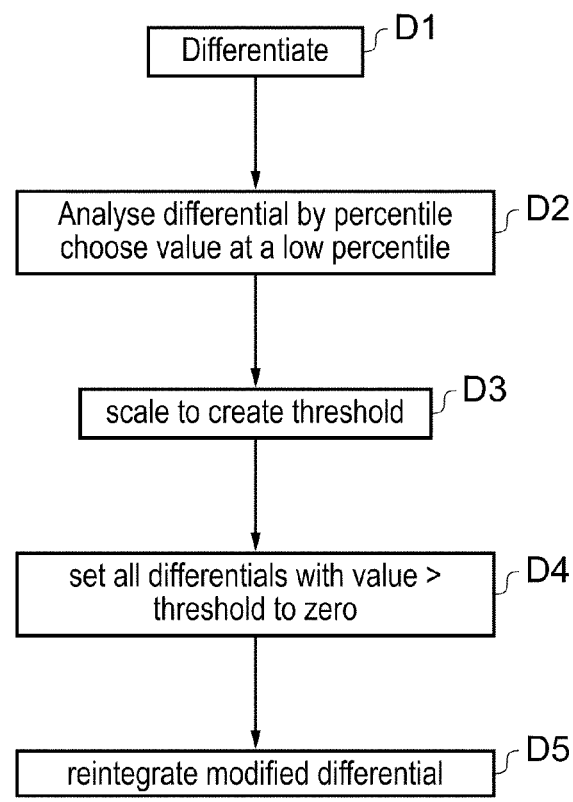
FIG. 12 shows a flow diagram showing how transition capping can be performed.

To address the defects in such approaches, the following technique can be used to enable a system which works equally well whether or not a scan area includes transitions in printing/patterning and which requires no advance knowledge of the article to be scanned. Thus, in the present example, the approach taken in optional step S4 is shown in FIG. 12.

Starting at step D1, the intensity values are differentiated to produce a series of differential values. Then, at step D2, the differential values are analysed by percentile to enable a value to be chosen at a low value. In the present example, the $50^{th}$ percentile may be conveniently used. Other percentile values around or below the $50^{th}$ may also be used.

Step D3 then creates a threshold by scaling the value at the chosen percentile by a scaling factor. The scaling factor can be derived empirically, although one scaling factor can be applicable to a wide range of surface material types. In the present examples, a scaling factor of 2.5 is used for many different surface material types including papers, cardboards, glossy papers and glossy cardboards.

Then, at step D4, all of the differential values are compared the threshold. Any differentials with a value greater than the threshold are set to a zero value. Once the differential values have been threshold checked, the modified differentials are re-integrated at step D5.

In the present example, all of these steps are carried out after conversion of the analogue data from the photodetectors to multilevel digital values. In an example where the photodetectors output a digital intensity signal rather than an analogue signal, no digitisation would be necessary.

This system therefore spots the large transitions which are too large to be the surface texture/roughness response and caps those transitions in order to avoid the texture/roughness response data being masked by the large transition.

The effects of step S4 on data from a highly printed surface are illustrated in FIGS. 13a and 13b. FIG. 13a shows the data immediately before carrying out optional step S4, for data retrieved from a surface with a series of high contrast stripes transverse to the scan direction. The same data set, after processing by step S4 is shown in FIG. 13b, where it can be seen that the amount of surface information preserved is high despite the high contrast transitions.

By way of comparison, FIGS. 14a and 14b illustrate that the system implemented in S4 does not cause problems in data without high contrast printed transitions. FIG. 14a shows the data immediately before carrying out step S4, for data retrieved from a plain surface. The same data set, after processing by step S4 is shown in FIG. 14b, where it can be seen that the amount of surface information is not reduced despite the carrying out of the process of S4.

Step S5 applies a space-domain band-pass filter to the captured data. This filter passes a range of wavelengths in the x-direction (the direction of movement of the scan head). The filter is designed to maximise decay between samples and maintain a high number of degrees of freedom within the data. With this in mind, the lower limit of the filter passband is set to have a fast decay. This is required as the absolute intensity value from the target surface is uninteresting from the point of view of signature generation, whereas the variation between areas of apparently similar intensity is of interest. However, the decay is not set to be too fast, as doing so can reduce the randomness of the signal, thereby reducing the degrees of freedom in the captured data. The upper limit can be set high; whilst there may be some high frequency noise or a requirement for some averaging (smearing) between values in the x-direction (much as was discussed above for values in the y-direction), there is typically no need for anything other than a high upper limit. In some examples a $2^{nd}$ order filter can be used. In one example, where the speed of travel of the focussed beam over the target surface is 20 mm per second, the filter may have an impulse rise distance 100 microns and an impulse fall distance of 500 microns.

Instead of applying a simple filter, it may be desirable to weight different parts of the filter. In one example, the weighting applied is substantial, such that a triangular passband is created to introduce the equivalent of realspace functions such as differentiation. A differentiation type effect may be useful for highly structured surfaces, as it can serve to attenuate correlated contributions (e.g. from surface printing on the target) from the signal relative to uncorrelated contributions.

Step S6 is a digitisation step where the multi-level digital signal (the processed output from the ADC) is converted to a bi-state digital signal to compute a digital signature representative of the scan. The digital signature is obtained in the present example by applying the rule: $a_k(i)$>mean maps onto binary '1' and $a_k(i)$<=mean maps onto binary '0'. The digitised data set is defined as $d_k(i)$ where i runs from 1 to N. The signature of the article may advantageously incorporate further components in addition to the digitised signature of the intensity data just described. These further optional signature components are now described.

Step S7 is an optional step in which a smaller 'thumbnail' digital signature is created. In some examples, this can be a realspace thumbnail produced either by averaging together adjacent groups of m readings, or by picking every cth data point, where c is the compression factor of the thumbnail. The latter may be preferable since averaging may disproportionately amplify noise. In other examples, the thumbnail can be based on a Fast Fourier Transform of some or all of the signature data. The same digitisation rule used in Step S6 is then applied to the reduced data set. The thumbnail digitisation is defined as $t_k(i)$ where i runs 1 to N/c and c is the compression factor.

Step S8 is an optional step applicable when multiple detector channels exist (i.e. where k>1). The additional component is a cross-correlation component calculated between the intensity data obtained from different ones of the photodetectors. With 2 channels there is one possible cross-correlation coefficient, with 3 channels up to 3, and with 4 channels up to 6 etc. The cross-correlation coefficients can be useful, since it has been found that they are good indicators of material type. For example, for a particular type of document, such as a passport of a given type, or laser printer paper, the cross-correlation coefficients always appear to lie in predictable ranges. A normalised cross-correlation can be calculated between $a_k(i)$ and $a_l(i)$, where k≠l and k,l vary across all of the photodetector channel numbers. The normalised cross-correlation function is defined as:

$$\Gamma(k,l) = \frac{\sum_{i=1}^{N} a_k(i) a_l(i)}{\sqrt{\left(\sum_{i=1}^{N} a_k(i)^2\right)\left(\sum_{i=1}^{N} a_l(i)^2\right)}}$$

Another aspect of the cross-correlation function that can be stored for use in later verification is the width of the peak in the cross-correlation function, for example the full width half maximum (FWHM). The use of the cross-correlation coefficients in verification processing is described further below.

Step S9 is another optional step which is to compute a simple intensity average value indicative of the signal intensity distribution. This may be an overall average of each of the mean values for the different detectors or an average for each detector, such as a root mean square (rms) value of $a_k(i)$. If the detectors are arranged in pairs either side of normal incidence as in the reader described above, an average for each pair of detectors may be used. The intensity value has been found to be a good crude filter for material type, since it is a simple indication of overall reflectivity and roughness of the sample. For example, one can use as the intensity value the unnormalised rms value after removal of the average value, i.e. the DC background. The rms value provides an indication of the reflectivity of the surface, in that the rms value is related to the surface roughness.

The signature data obtained from scanning an article can be compared against records held in a signature database for verification purposes and/or written to the database to add a new record of the signature to extend the existing database and/or written to the article in encoded form for later verification with or without database access.

A new database record will include the digital signature obtained in Step S6 as well as optionally its smaller thumbnail version obtained in Step S7 for each photodetector channel, the cross-correlation coefficients obtained in Step S8 and the average value(s) obtained in Step S9. Alternatively, the thumbnails may be stored on a separate database of their own optimised for rapid searching, and the rest of the data (including the thumbnails) on a main database.

Figure 15:
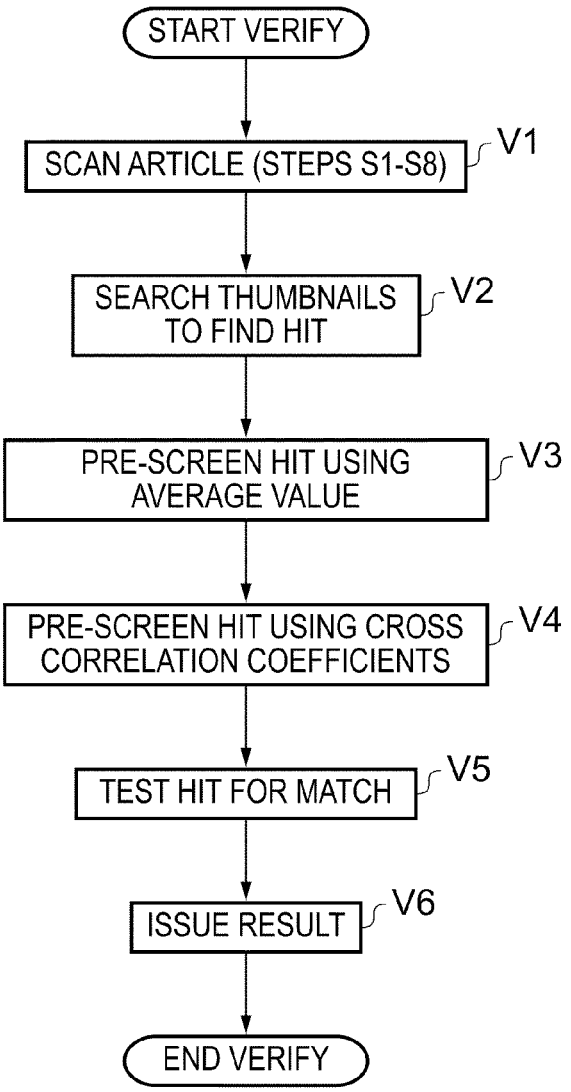
FIG. 15 is a flow diagram showing how a signature of an article obtained from a scan can be verified against a signature database.

FIG. 15 is a flow diagram showing how a signature of an article obtained from a scan can be verified against a signature database.

In a simple implementation, the database could simply be searched to find a match based on the full set of signature data. However, to speed up the verification process, the process of the present example uses the smaller thumbnails and pre-screening based on the computed average values and cross-correlation coefficients as now described. To provide such a rapid verification process, the verification process is carried out in two main steps, first using the thumbnails derived from the amplitude component of the Fourier transform of the scan data (and optionally also pre-screening based on the computed average values and cross-correlation coefficients) as now described, and second by comparing the scanned and stored full digital signatures with each other.

Verification Step V1 is the first step of the verification process, which is to scan an article according to the process described above, i.e. to perform Scan Steps S1 to S8. This scan obtains a signature for an article which is to be validated against one or more records of existing article signatures Verification Step V2 seeks a candidate match using the thumbnail (derived either from the Fourier transform amplitude component of the scan signal or as a realspace thumbnail from the scan signal), which is obtained as explained above with reference to Scan Step S7. Verification Step V2 takes each of the thumbnail entries and evaluates the number of matching bits between it and $t_k(i+j)$, where j is a bit offset which is varied to compensate for errors in placement of the scanned area. The value of j is determined and then the thumbnail entry which gives the maximum number of matching bits. This is the 'hit' used for further processing. A variation on this would be to include the possibility of passing multiple candidate matches for full testing based on the full digital signature. The thumbnail selection can be based on any suitable criteria, such as passing up to a maximum number of, for example 10 or 100, candidate matches, each candidate match being defined as the thumbnails with greater than a certain threshold percentage of matching bits, for example 60%. In the case that there are more than the maximum number of candidate matches, only the best candidates are passed on. If no candidate match is found, the article is rejected (i.e. jump to Verification Step V6 and issue a fail result).

This thumbnail based searching method employed in the present example delivers an overall improved search speed, for the following reasons. As the thumbnail is smaller than the full signature, it takes less time to search using the thumbnail than using the full signature. Where a realspace thumbnail is used, the thumbnail needs to be bit-shifted against the stored thumbnails to determine whether a "hit" has occurred, in the same way that the full signature is bit-shifted against the stored signature to determine a match. The result of the thumbnail search is a shortlist of putative matches, each of which putative matches can then be used to test the full signature against.

Where the thumbnail is based on a Fourier Transform of the signature or part thereof, further advantages may be realised as there is no need to bit-shift the thumbnails during the search. A pseudo-random bit sequence, when Fourier transformed, carries some of the information in the amplitude spectrum and some in the phase spectrum. Any bit shift only affects the phase spectrum, however, and not the amplitude spectrum. Amplitude spectra can therefore be matched without any knowledge of the bit shift. Although some information is lost in discarding the phase spectrum, enough remains in order to obtain a rough match against the database. This allows one or more putative matches to the target to be located in the database. Each of these putative matches can then be compared properly using the conventional real-space method against the new scan as with the realspace thumbnail example.

Verification Step V3 is an optional pre-screening test that is performed before analysing the full digital signature stored for the record against the scanned digital signature. In this pre-screen, the rms values obtained in Scan Step S9 are compared against the corresponding stored values in the database record of the hit. The 'hit' is rejected from further processing if the respective average values do not agree within a predefined range. The article is then rejected as non-verified (i.e. jump to Verification Step V6 and issue fail result).

Verification Step V4 is a further optional pre-screening test that is performed before analysing the full digital signature. In this pre-screen, the cross-correlation coefficients obtained in Scan Step S8 are compared against the corresponding stored values in the database record of the hit. The 'hit' is rejected from further processing if the respective cross-correlation coefficients do not agree within a predefined range. The article is then rejected as non-verified (i.e. jump to Verification Step V6 and issue fail result).

Another check using the cross-correlation coefficients that could be performed in Verification Step V4 is to check the width of the peak in the cross-correlation function, where the cross-correlation function is evaluated by comparing the value stored from the original scan in Scan Step S7 above and the re-scanned value:

$$\Gamma_{k,l}(j) = \frac{\sum_{i=1}^{N} a_k(i) a_l(i+j)}{\sqrt{\left(\sum_{i=1}^{N} a_k(i)^2\right)\left(\sum_{i=1}^{N} a_l(i)^2\right)}}$$

If the width of the re-scanned peak is significantly higher than the width of the original scan, this may be taken as an indicator that the re-scanned article has been tampered with or is otherwise suspicious. For example, this check should beat a fraudster who attempts to fool the system by printing a bar code or other pattern with the same intensity variations that are expected by the photodetectors from the surface being scanned.

Verification step V5 performs a test to determine whether the putative match identified as a "hit" is in fact a match. In the present example, this test is self-calibrating, such that it avoids signature loss caused by sudden transitions on the scanned surface (such as printed patterns causing step changes in reflected light). This provides simpler processing and avoids the potential for loss of a significant percentage of the data which should make up a signature due to printing or other patterns on an article surface.

As has been described above with reference to step S4 and FIGS. 9 to 14, actions can be taken at the signature generation stage to limit the impact of surface patterning/printing on authentication/validation match confidence. In the present examples, an additional approach can be taken to minimise the impact upon the match result of any data bits within the signature which have been set by a transition effect rather than by the roughness/texture response of the article surface. This can be carried out whether or not the transition capping approach described above with reference to FIGS. 9 to 14 is performed.

Thus, in step V5, after the shortlist of hits has been complied using the thumbnail search and after the optional pre-screening of V4, a number of actions are carried out.

Firstly, a full signature comparison is performed between the record signature for each of the shortlist signatures and the test signature to select the signature with the best overall match result. This is selected as the best match signature. To aid in establishing whether the best match signature is actually a match result or is just a relatively high scoring non-match, a measure of the randomness of the bits of the signature is used to weight the cross-correlation result for the best match signature.

To establish the measure of the randomness of the bits in the signature, the best match signature is cross-correlated with the record signature for the other signatures in the shortlist identified by the thumbnails. From a sliding cross-correlation of each shortlist signature against the best match signature, a best result position can be found for each of those shortlist signatures against the best match signature. Then, the number of times that each bit value of the best match signature also occurs in the best result position of each of the shortlist signatures is measured.

This measured value is representative of the randomness of each bit within the best match signature. For example, if a given bit value is the same in approximately half of the shortlist signatures, then the bit is probably random, whereas if the given bit value is the same in approximately 90% of the shortlist signatures, then the bit is probably not random. To quantify this measure, the present examples define and use a bit utility ratio.

$$BitUtilityRatio \left\{ \begin{array}{l} = 4(1 - AverageBitBMR)^2 \\ AverageBitBMR \geq 0.5 \\ = 1 \\ AverageBitBMR < 0.5 \end{array} \right\}$$

This provides that for bits exhibiting a good level of randomness, a Bit Utility Ratio of or approaching 1 will be applied, and for bits exhibiting low level of randomness, a Bit Utility Ratio of or approaching zero will be applied. Referring again to the examples above, if a given bit value is the same in approximately half of the shortlist signatures (AverageBitBMR=0.5), then the Bit Utility Ratio=1, whereas if the given bit value is the same in approximately 90% of the shortlist signatures (AverageBitBMR=0.9), then the Bit Utility Ratio is 0.04.

The Bit Utility Ratio calculated for each bit of the best match signature is then used to weight the cross-correlation result for the comparison between the test signature and the best match signature. Thus, instead of simply summing the comparison result for each bit comparison in the cross-correlation as would conventionally be performed, the Bit Utility Ratio for each bit is used to weight each bit result before the bit results are summed. Thus, whereas the cross-correlation sum result is defined, when no weighting is applied as:

$$BMR = \frac{\sum_i f(i) \otimes g(i)}{\sum_i 1}$$

where $f(i)$ represents the $i^{th}$ value of the test signature and $g(i)$ represents the $i^{th}$ value of the record signature; the cross-correlation sum result is defined, when using the Bit Utility Ratio (BUR) as a weighting, as:

$$CorrectedBMR = \frac{\sum_i f(i) \otimes g(i) \cdot BUR(i)}{\sum_i BUR(i)}$$

where $BUR(i)$ represents the Bit Utility Ratio for the $i^{th}$ bit of the record signature.

Figure 16:
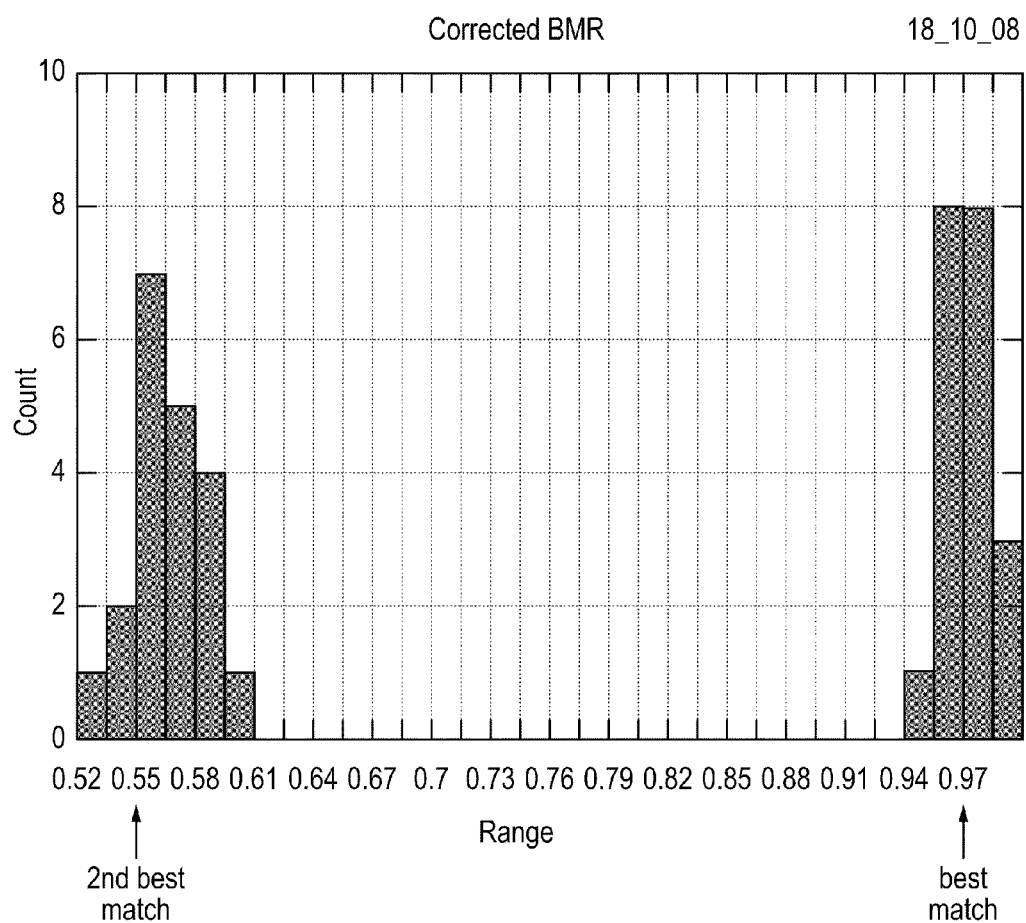
FIG. 16 shows schematically how the effects of high contrast transitions on bit match ratios can be mitigated.

This corrected Bit Match Ratio can then be used to assess whether the best match record signature is in fact taken form the same article as the test signature. FIG. 16 shows, by way of comparison with FIG. 10, that the peak for comparisons between different scans of a single article (i.e. a match result) is centred at a bit match ratio of around 97%, whereas the peak for the second best match, where a comparison is performed against scans of different articles is now centred at a bit match ratio of around 55%. Thus the distinction between a non-match and a match is much clearer and more distinct.

As will be clear to the skilled reader, each of the two processes implemented in the present example separately provides a significant contribution to avoiding match results reaching a wrong conclusion due to printing or patterning on an article surface. Implementation of either one (or both) of these techniques can therefore enable a single authentication or verification system to work on a variety of article types without any need to know which article type is being considered or any need to pre-configure a record signature database before population.

In alternative examples, the approach to conduct of step V5 as described in EP1,730,675A can be used instead of the example above.

Verification Step V6 issues a result of the verification process. In experiments carried out upon paper, it has generally been found that 75% of bits in agreement represents a good or excellent match, whereas 50% of bits in agreement represents no match.

The determination of whether a given result represents a match or a non-match is performed against a threshold or set of thresholds. The level of distinction required between a match and a non-match can be set according to a level of sensitivity to false positives and false negatives in a particular application. The threshold may relate to an absolute BMR value and/or may include a measure of the peak width for a group of non-match results from shortlisted record signatures and/or may include a measure of the separation in BMR between the best result and the second best result.

By way of example, it has been experimentally found that a database comprising 1 million records, with each record containing a 128-bit thumbnail (either derived from the Fourier transform amplitude spectrum or as a realspace thumbnail), can be searched in 1.7 seconds on a standard PC computer of 2004 specification. 10 million entries can be searched in 17 seconds. More modern computers and high-end server computers can be expected to achieve speeds of 10 or more times faster than this.

Thus a method for verification of whether or not a signature generated from an article has been previously included in a database of known articles has been described.

It will be appreciated that many variations are possible. For example, instead of treating the cross-correlation coefficients as a pre-screen component, they could be treated together with the digitised intensity data as part of the main signature. For example the cross-correlation coefficients could be digitised and added to the digitised intensity data. The cross-correlation coefficients could also be digitised on their own and used to generate bit strings or the like which could then be searched in the same way as described above for the thumbnails of the digitised intensity data in order to find the hits.

Thus a number of options for comparing a test signature to record signatures to obtain a match confidence result have been described.

Figure 17:
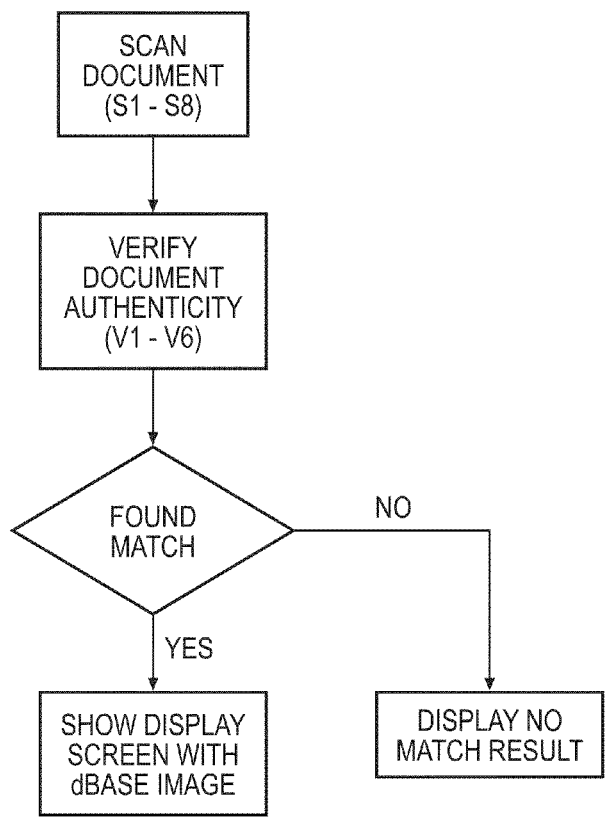
FIG. 17 is a flow diagram showing the overall process of how a document is scanned for verification purposes and the results presented to a user.

FIG. 17 is a flow diagram showing the overall process of how a document is scanned for verification purposes and the results presented to a user. First the document is scanned according to the scanning steps of FIG. 8. The document authenticity is then verified using the verification steps of FIG. 15. If there is no matching record in the database, a "no match" result can be displayed to a user. If there is a match, this can be displayed to the user using a suitable user interface. The user interface may be a simple yes/no indicator system such as a lamp or LED which turns on/off or from one colour to another for different results. The user interface may also take the form of a point of sale type verification report interface, such as might be used for conventional verification of a credit card. The user interface might be a detailed interface giving various details of the nature of the result, such as the degree of certainty in the result and data describing the original article or that article's owner. Such an interface might be used by a system administrator or implementer to provide feedback on the working of the system. Such an interface might be provided as part of a software package for use on a conventional computer terminal.

It will thus be appreciated that when a database match is found a user can be presented with relevant information in an intuitive and accessible form which can also allow the user to apply his or her own common sense for an additional, informal layer of verification. For example, if the article is a document, any image of the document displayed on the user interface should look like the document presented to the verifying person, and other factors will be of interest such as the confidence level and bibliographic data relating to document origin. The verifying person will be able to apply their experience to make a value judgement as to whether these various pieces of information are self consistent.

On the other hand, the output of a scan verification operation may be fed into some form of automatic control system rather than to a human operator. The automatic control system will then have the output result available for use in operations relating to the article from which the verified (or non-verified) signature was taken.

Figure 18:
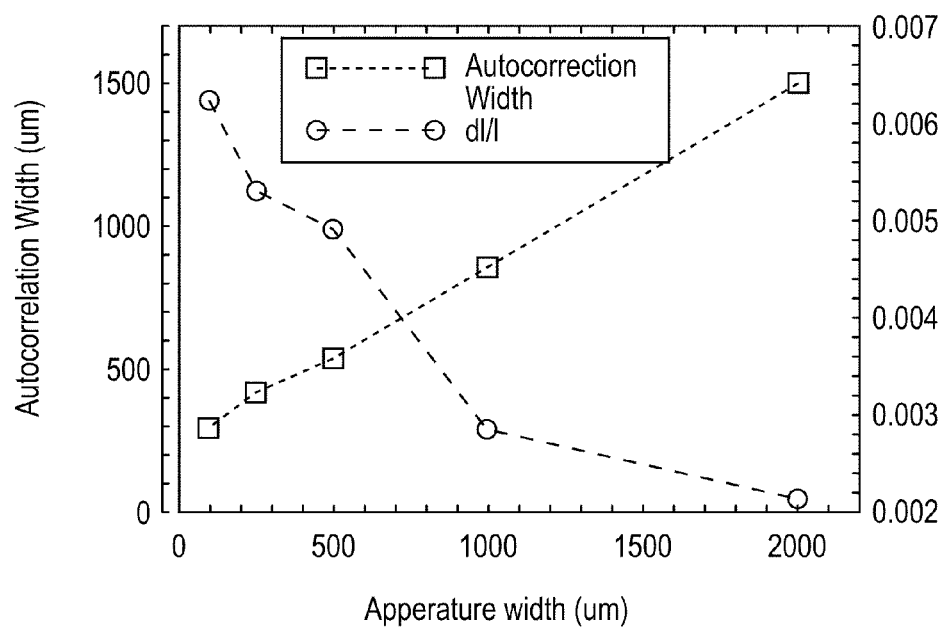
FIG. 18 shows graphically the effect of changing focus.

As has been discovered from the inventors' previous work on laser based systems, the focus of the light onto the article surface is important in terms of getting good quality data from which a reliable and reproducible signature can be generated. FIG. 18 illustrates the effect of the focus accuracy on the resulting signature.

As can be seen from FIG. 18, as the aperture width (the effective aperture that defines the focussed beam shape, either a physical aperture such as shown in FIG. 4, or an effective aperture created by focussing lenses) increases, the autocorrelation width (i.e. the full width half max of the peak resultant from signature being cross-correlated against itself) increases which indicates that the received signal from the photodetector contains less information, which means that the number of effective bits in the signature when it comes to determining uniqueness is reduced. Also, as the aperture width increases, the dI/I measure which shows the fractional intensity change in the signal received by the photodetector as it changes (in a way this is the "strength" of the received signal) decreases, which indicates that the received signal which is created by the surface structure of the target is weakening.

The performance of different illumination techniques is illustrated in FIGS. 19A-19D. Each figure shows plotted against one another two consecutive scans of the same region of the same article. The article was a 5 mm length scan area of ground glass having an RMS surface roughness height of 1.8 μm. Where the two scans return almost identical data, the differences between the two plots in each figure are barely noticeable.

Figure 19A:
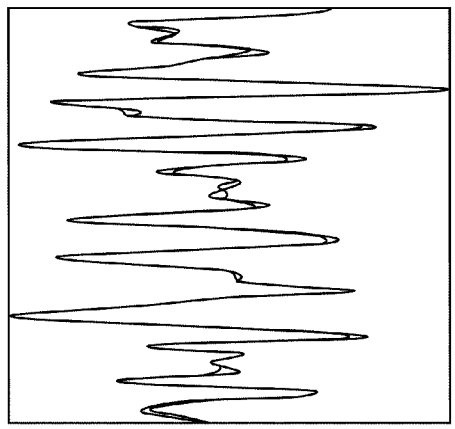
FIGS. 19A to 19D show graphically the reproducibility using different sources.

FIG. 19A shows the results where the illumination is from a structured LED source, such as the LED array discussed with reference to FIG. 2 above.

Figure 19B:
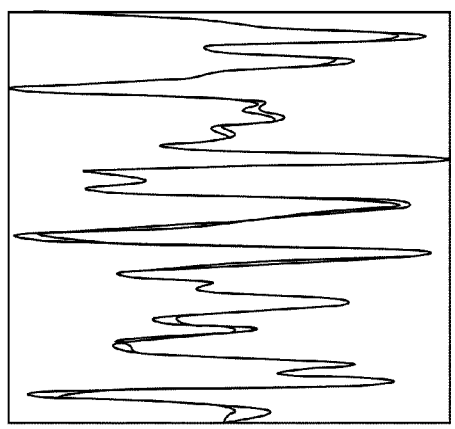

FIG. 19B shows, for comparison, the results where the illumination is from a collimated laser source focussed to the elongate focus by a cylindrical lens.

Figure 19C:
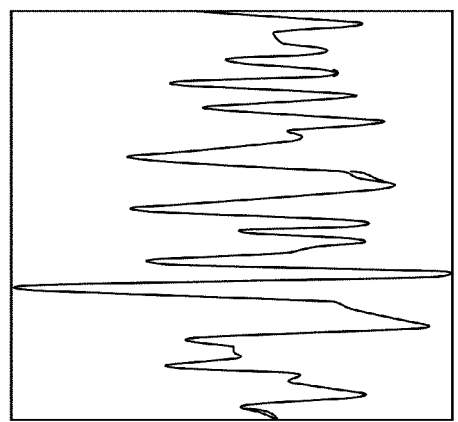

FIG. 19C shows the results from a structured aperture arrangement such as that discussed with reference to FIG. 3 above where the source is a thermal source such as a filament lamp.

Figure 19D:
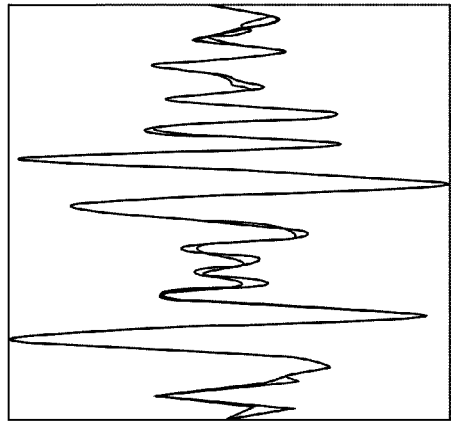

FIG. 19D shows the results from a structured aperture arrangement such as that discussed with reference to FIG. 3 above where the source is an LED.

As can be seen in all cases, the correspondence between the two scans is very good, such that a high level of reproducibility is achievable with both structured and unstructured sources.

Figure 20:
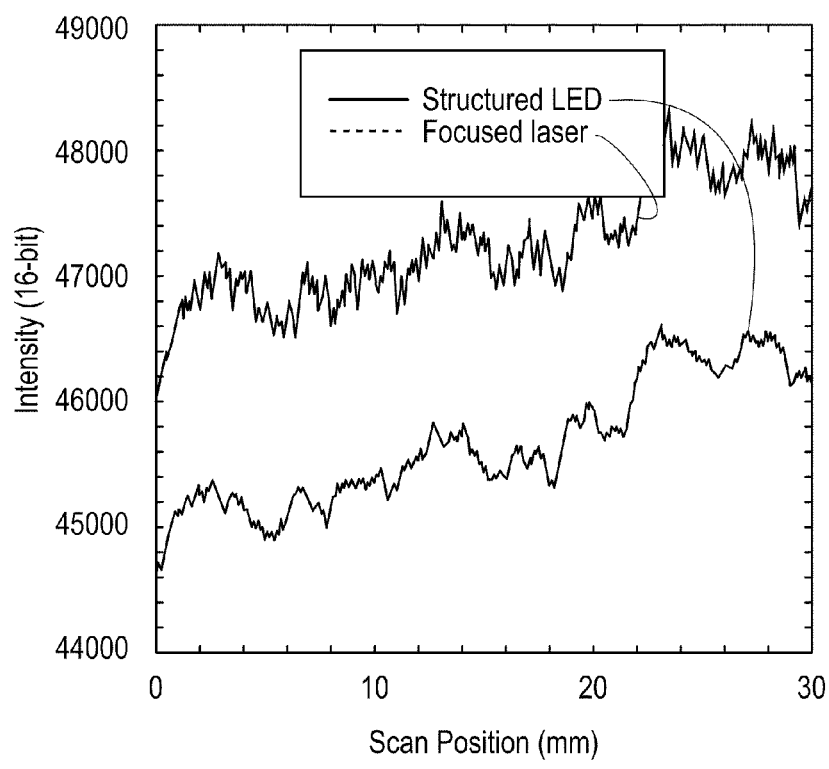
FIG. 20 shows graphically the relative intensity of reflections using coherent and non-coherent sources.

FIG. 19 illustrate the reproducibility of signature generation for the different source types, which is an important consideration where an article is going to be validated or authenticated based upon its ability to generate substantially the same signature when analysed or interrogated on multiple different occasions. Another important consideration is the strength of the signal from which the signature is to be generated, i.e. the intensity of the reflections or refractions from the reading volume. This is illustrated in FIG. 20, where the intensity of the reflections from a structured LED source and a laser source are compared. The two plots in FIG. 20 are for 30 mm scans of approximately the same part of a paper substrate, thus slight differences in peak location and relative peak size are not important in comparing the performance of the two sources. What can be read from FIG. 23 however is the relative intensity of the reflections from the structured LED source are slightly less than those from the laser source in that the fine peaks for the LED source trace are relatively smaller than those of the laser source trace. Thus it appears that the laser source reads the fine surface structure with higher amplitude than the LED source.

Figure 21:
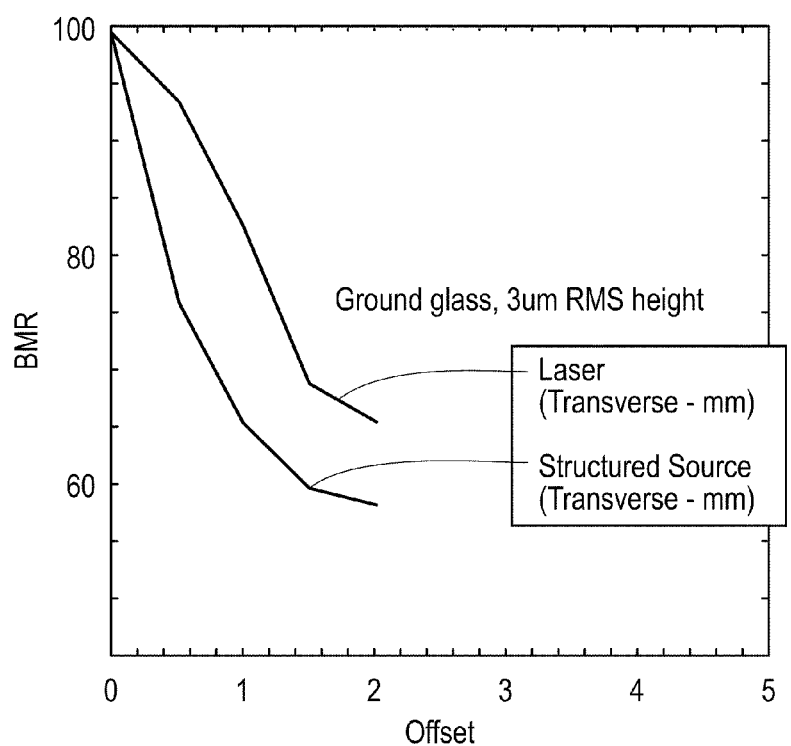
FIG. 21 shows graphically the effect of misalignment between scans.

FIG. 21 shows a comparison of the resistance of a generated signature to offset in the positioning of the scanner relative to the target surface for different scans of the same object. As can be seen from FIG. 21, the drop-off in cross-correlation bit match ratio between different scans of the same article drops off with transverse translational mispositioning between scans for the structured source slightly faster than for the laser source.

Figure 22:
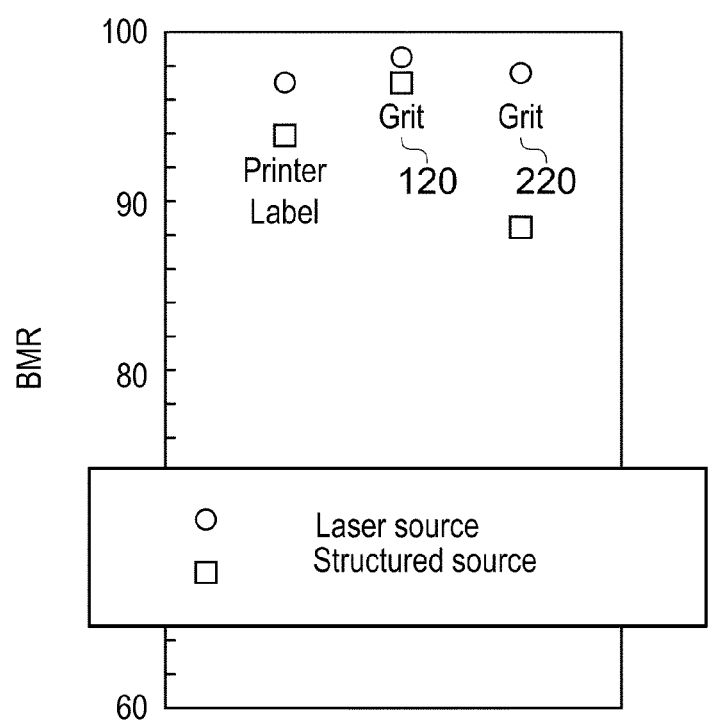
FIG. 22 shows graphically the relative overall performance using coherent and non-coherent sources.

A further comparison between performance using a laser source and using a non-coherent source is shown in FIG. 22. This graph shows the Bit Match Ratio achieved when comparing different scans of the same substrate using both a laser source based scanner and a structured non-coherent based scanner for a variety of substrates. The results show the strength of result for a known match for the target substrates of a paper printer label (such as those produced by Avery Dennison Corporation) and for surfaces of measured surface roughness 120 Grit (test target Thor Labs DG100X100-120 ground glass diffuser) and 220 Grit (test target Thor Labs DX100X100-220 ground glass diffuser).

This graph shows that for larger surface texture sizes (paper, particle size >~100 μm), the performance of the non-coherent source is comparable to that of the laser but that the performance of the non-coherent source may drop for smaller surface texture sizes.

Accordingly, it is clear that use of a non-coherent light source for scanning a target substrate to create a reproducible signature therefrom is a viable option for a variety of circumstances. There are three issues to implementation of a non-laser system of this type, and these are the ability to get the necessary focus, the ability to get a necessary intensity of reflection at that focus, and whether the optical properties of laser scattering will work with non-laser light under the particular conditions. As can be seen from the above, the focus can be obtained and sufficient intensity can be obtained and the laser scattering effect occurs sufficiently well for the system to work and provide useful and reproducible data, Thus there have now been described methods for scanning an article without the use of a laser source to create a signature therefrom and for comparing a resulting scan to an earlier record signature of an article to determine whether the scanned article is the same as the article from which the record signature was taken. These methods can provide a determination of whether the article matches one from which a record scan has already been made to a very high degree of accuracy.

From one point of view, there has thus now been described, in summary, a system in which a digital signature is obtained by digitising a set of data points obtained by scanning a focussed noncoherent beam over a paper, cardboard, plastic, metal or other article, and measuring the scatter. A thumbnail digital signature is also determined, either in realspace by averaging or compressing the data, or by digitising an amplitude spectrum of a Fourier transform of the set of data points. A database of digital signatures and their thumbnails can thus be built up. The authenticity of an article can later be verified by re-scanning the article to determine its digital signature and thumbnail, and then searching the database for a match. Searching is done on the basis of the thumbnail to improve search speed. Use of a Fourier transform based thumbnail can improve speed, since, in a pseudo-random bit sequence, any bit shift only affects the phase spectrum, and not the amplitude spectrum, of a Fourier transform represented in polar co-ordinates. The amplitude spectrum stored in the thumbnail can therefore be matched without any knowledge of the unknown bit shift caused by registry errors between the original scan and the re-scan.

In some examples, the method for extracting a signature from a scanned article can be optimised to provide reliable recognition of an article despite deformations to that article caused by, for example, stretching or shrinkage. Such stretching or shrinkage of an article may be caused by, for example, water damage to a paper or cardboard based article.

Also, an article may appear to a scanner to be stretched or shrunk if the relative speed of the article to the sensors in the scanner is non-linear. This may occur if, for example the article is being moved along a conveyor system, or if the article is being moved through a scanner by a human holding the article. An example of a likely scenario for this to occur is where a human scans, for example, a bank card using a swipe-type scanner.

In some examples, where a scanner is based upon a scan head which moves within the scanner unit relative to an article held stationary against or in the scanner, then linearisation guidance can be provided within the scanner to address any non-linearities in the motion of the scan head. Where the article is moved by a human, these non-linearities can be greatly exaggerated To address recognition problems which could be caused by these non-linear effects, it is possible to adjust the analysis phase of a scan of an article. Thus a modified validation procedure will now be described with reference to FIG. 23a. The process implemented in this example uses a block-wise analysis of the data to address the non-linearities.

The process carried out in accordance with FIG. 23a can include some or all of the steps of time domain filtering, alternative or additional linearisation, transition capping, space domain filtering, smoothing and differentiating the data, and digitisation for obtaining the signature and thumbnail described with reference to FIG. 8, but are not shown in FIG. 23a so as not to obscure the content of that figure.

Figure 23A:
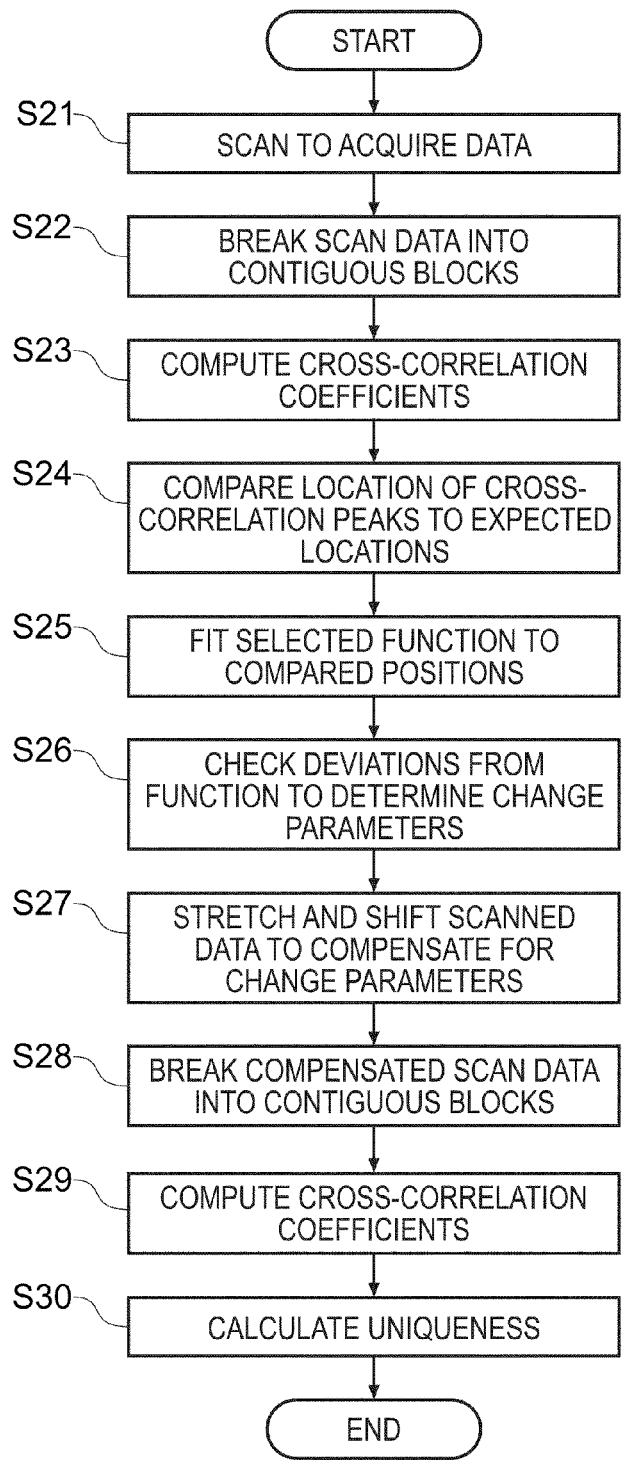
FIG. 23a is a flow diagram showing how the verification process of FIG. 18 can be altered to account for non-idealities in a scan.

As shown in FIG. 23a, the scanning process for a validation scan using a block-wise analysis starts at step S21 by performing a scan of the article to acquire the date describing the intrinsic properties of the article. This scanned data is then divided into contiguous blocks (which can be performed before or after digitisation and any smoothing/differentiation or the like) at step S22. In one example, a scan area of 1600 mm$^2$ (e.g. 40 mm×40 mm) is divided into eight equal length blocks. Each block therefore represents a subsection of the scanned area of the scanned article.

For each of the blocks, a cross-correlation is performed against the equivalent block for each stored signature with which it is intended that article be compared at step S23. This can be performed using a thumbnail approach with one thumbnail for each block. The results of these cross-correlation calculations are then analysed to identify the location of the cross-correlation peak. The location of the cross-correlation peak is then compared at step S24 to the expected location of the peak for the case where a perfectly linear relationship exists between the original and later scans of the article.

As this block-matching technique is a relatively computationally intensive process, in some examples its use may be restricted to use in combination with a thumbnail search such that the block-wise analysis is only applied to a shortlist of potential signature matches identified by the thumbnail search.

Figure 24A:
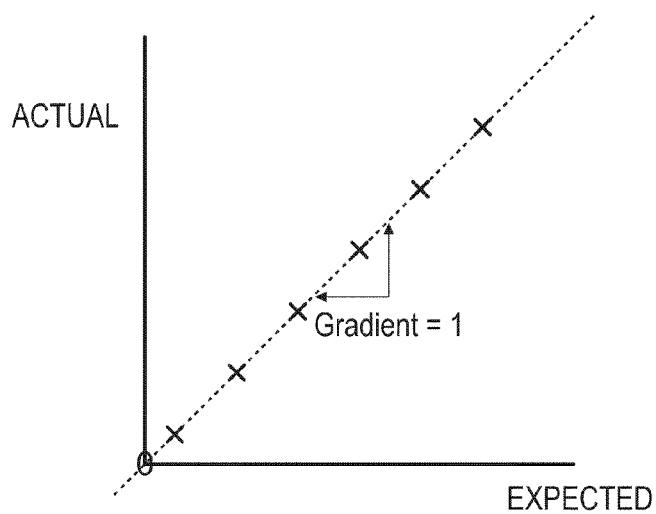
FIG. 24A shows an example of cross-correlation data gathered from a scan.
Figure 24B:
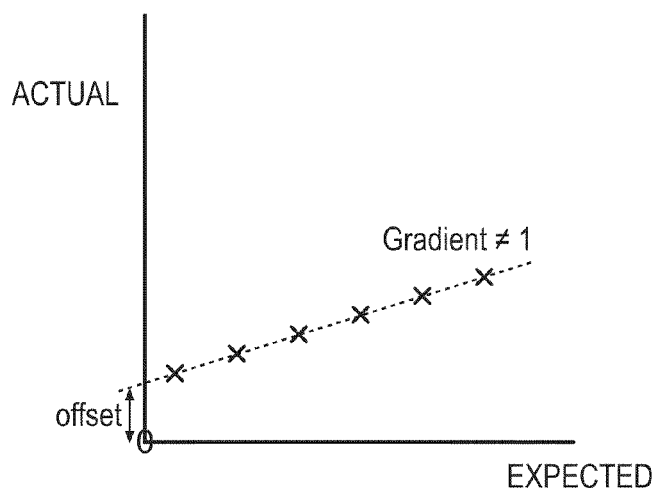
FIG. 24b shows an example of cross-correlation data gathered from a scan where the scanned article is distorted.
Figure 24C:
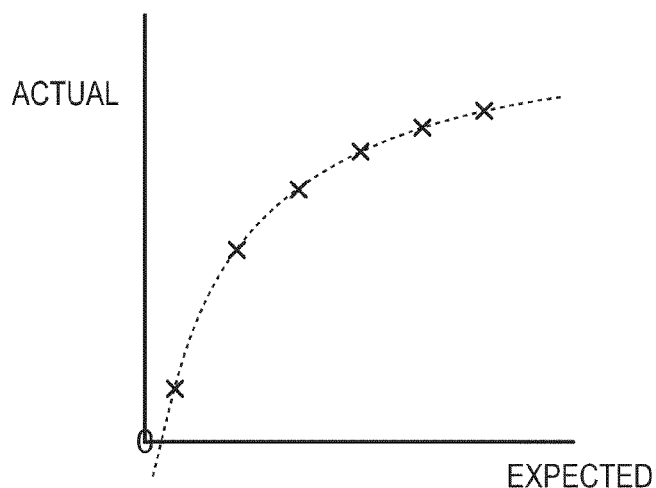
FIG. 24C shows an example of cross-correlation data gathered from a scan where the scanned article is scanned at non-linear speed.

This relationship can be represented graphically as shown in FIGS. 24A, 24B and 24C. In the example of FIG. 24A, the cross-correlation peaks are exactly where expected, such that the motion of the scan head relative to the article has been perfectly linear and the article has not experienced stretch or shrinkage. Thus a plot of actual peak positions against expected peak results in a straight line which passes through the origin and has a gradient of 1.

In the example of FIG. 24B, the cross-correlation peaks are closer together than expected, such that the gradient of a line of best fit is less than 1. Thus the article has shrunk relative to its physical characteristics upon initial scanning. Also, the best fit line does not pass through the origin of the plot. Thus the article is shifted relative to the scan head compared to its position for the record scan.

In the example of FIG. 24C, the cross correlation peaks do not form a straight line. In this example, they approximately fit to a curve representing a y$^2$ function. Thus the movement of the article relative to the scan head has slowed during the scan. Also, as the best fit curve does not cross the origin, it is clear that the article is shifted relative to its position for the record scan.

A variety of functions can be test-fitted to the plot of points of the cross-correlation peaks to find a best-fitting function. Thus curves to account for stretch, shrinkage, misalignment, acceleration, deceleration, and combinations thereof can be used. Examples of suitable functions can include straight line functions, exponential functions, a trigonometric functions, x$^2$ functions and x$^3$ functions.

Once a best-fitting function has been identified at step S25, a set of change parameters can be determined which represent how much each cross-correlation peak is shifted from its expected position at step S26. These compensation parameters can then, at step S27, be applied to the data from the scan taken at step S21 in order substantially to reverse the effects of the shrinkage, stretch, misalignment, acceleration or deceleration on the data from the scan. As will be appreciated, the better the best-fit function obtained at step S25 fits the scan data, the better the compensation effect will be.

The compensated scan data is then broken into contiguous blocks at step S28 as in step S22. The blocks are then individually cross-correlated with the respective blocks of data from the stored signature at step S29 to obtain the cross-correlation coefficients. This time the magnitude of the cross-correlation peaks are analysed to determine the uniqueness factor at step S29. Thus it can be determined whether the scanned article is the same as the article which was scanned when the stored signature was created.

Accordingly, there has now been described an example of a method for compensating for physical deformations in a scanned article, and/or for non-linearities in the motion of the article relative to the scanner. Using this method, a scanned article can be checked against a stored signature for that article obtained from an earlier scan of the article to determine with a high level of certainty whether or not the same article is present at the later scan. Thereby an article constructed from easily distorted material can be reliably recognised. Also, a scanner where the motion of the scanner relative to the article may be non-linear can be used, thereby allowing the use of a low-cost scanner without motion control elements.

Figure 23B:
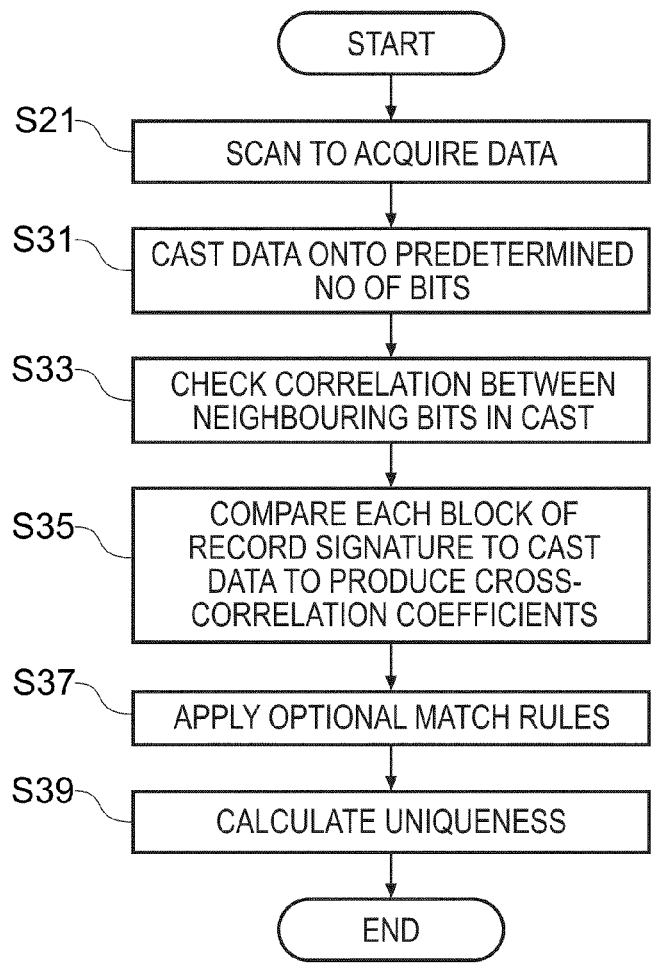
FIG. 23b is a flow diagram showing another example of how the verification process of FIG. 15 can be altered to account for non-idealities in a scan.

An alternative method for performing a block-wise analysis of scan data is presented in FIG. 23b This method starts at step S21 with performing a scan of the target surface as discussed above with reference to step S21 of FIG. 23a. Once the data has been captured, this scan data is cast onto a predetermined number of bits at step S31. This consists of an effective reduction in the number of bits of scan data to match the cast length. In the present example, the scan data is applied to the cast length by taking evenly spaced bits of the scan data in order to make up the cast data.

Next, step S33, a check is performed to ensure that there is a sufficiently high level of correlation between adjacent bits of the cast data. In practice, it has been found that correlation of around 50% between neighbouring bits is sufficient. If the bits are found not to meet the threshold, then the filter which casts the scan data is adjusted to give a different combination of bits in the cast data.

Once it has been determined that the correlation between neighbouring bits of the cast data is sufficiently high, the cast data is compared to the stored record signature at step S35. This is done by taking each predetermined block of the record signature and comparing it to the cast data. In the present example, the comparison is made between the cast data and an equivalent reduced data set for the record signature. Each block of the record signature is tested against every bit position offset of the cast data, and the position of best match for that block is the bit offset position which returns the highest cross-correlation value.

Once every block of the record signature has been compared to the cast data, a match result (bit match ratio) can be produced for that record signature as the sum of the highest cross-correlation values for each of the blocks. Further candidate record signatures can be compared to the cast data if necessary (depending in some examples upon whether the test is a 1:1 test or a 1:many test).

After the comparison step is completed, optional matching rules can be applied at step S37. These may include forcing the various blocks of the record signature to be in the correct order when producing the bit match ration for a given record signature. For example if the record signature is divided into five blocks (block 1, block 2, block 3, block 4 and block 5), but the best cross-correlation values for the blocks, when tested against the cast data returned a different order of blocks (e.g. block 2, block 3, block 4, block 1, block 5) this result could be rejected and a new total calculated using the best cross-correlation results that keep the blocks in the correct order. This step is optional as, in experimental tests carried out, it has been seen that this type of rule makes little if any difference to the end results. This is believed to be due to the surface identification property operating over the length of the shorter blocks such that, statistically, the possibility of a wrong-order match occurring to create a false positive is extremely low.

Finally, at step S39, using the bit match ratio, the uniqueness can be determined by comparing the whole of the scan data to the whole of the record signature, including shifting the blocks of the record signature against the scan data based on the position of the cross-correlation peaks determined in step S35. This time the magnitude of the cross-correlation peaks are analysed to determine the uniqueness factor at step S39. Thus it can be determined whether the scanned article is the same as the article which was scanned when the stored record signature was created The block size used in this method can be determined in advance to provide for efficient matching and high reliability in the matching. When performing a cross-correlation between a scan data set and a record signature, there is an expectation that a match result will have a bit match ratio of around 0.9. A 1.0 match ratio is not expected due to the biometric-type nature of the property of the surface which is measured by the scan. It is also expected that a non-match will have a bit match ratio of around 0.5. The nature of the blocks as containing fewer bits than the complete signature tends to shift the likely value of the non-match result, leading to an increased chance of finding a false-positive. For example, it has been found by experiment that a block length of 32 bits moves the non-match to approximately 0.75, which is too high and too close to the positive match result at about 0.9 for many applications. Using a block length of 64 bits moves the non-match result down to approximately 0.68, which again may be too high in some applications. Further increasing the block size to 96 bits, shifts the non-match result down to approximately 0.6, which, for most applications, provides more than sufficient separation between the true positive and false positive outcomes. As is clear from the above, increasing the block length increases the separation between non-match and match results as the separation between the match and non-match peaks is a function of the block length. Thus it is clear that the block length can be increased for greater peak separation (and greater discrimination accuracy) at the expense of increased processing complexity caused by the greater number of bits per block. On the other hand, the block length may be made shorter, for lower processing complexity, if less separation between true positive and false positive outcomes is acceptable.

It is also possible to produce a uniqueness measure for individual subsets of the data gathered by the photodetectors and to combine those individual uniqueness values rather than combining the data and then calculating an overall uniqueness. For example, in some examples, the data is broken down into a set of blocks for processing and each block can have a BMR calculated therefor. This can be taken a step further such that a uniqueness measure is created for each block. Likewise, the data from individual photodetectors can be analysed to create a uniqueness thererfor.

By taking such a approach, additional information about the overall uniqueness may become apparent. For example if the data is split into 10 blocks and three of those blocks provide a very strong uniqueness and the other seven blocks return a weaker or non-existent uniqueness, then this might provide the same overall uniqueness as if the ten blocks all have a modest uniqueness. Thus tampering of articles, article damage, sensor malfunction and a number of other conditions can be detected.

Such an approach thus involves combining the individual block and/or photodetector uniquenesses to give the overall uniqueness. This is can be a straightforward combination of the values, or in some circumstances a weighting may be applied to emphasise the contribution of some values over others. To combine uniquenesses expressed in a logarithmic scale, the individual uniquenesses are summed (e.g. of three blocks each have a uniqueness of $10^{20}$, the overall uniqueness would be $10^{60}$), and the values are multiplied if a logarithmic scale is not used.

Another characteristic of an article which can be detected using a block-wise analysis of a signature generated based upon an intrinsic property of that article is that of localised damage to the article. For example, such a technique can be used to detect modifications to an article made after an initial record scan.

For example, many documents, such as passports, ID cards and driving licenses, include photographs of the bearer. If an authenticity scan of such an article includes a portion of the photograph, then any alteration made to that photograph will be detected. Taking an arbitrary example of splitting a signature into 10 blocks, three of those blocks may cover a photograph on a document and the other seven cover another part of the document, such as a background material. If the photograph is replaced, then a subsequent rescan of the document can be expected to provide a good match for the seven blocks where no modification has occurred, but the replaced photograph will provide a very poor match. By knowing that those three blocks correspond to the photograph, the fact that all three provide a very poor match can be used to automatically fail the validation of the document, regardless of the average score over the whole signature.

Also, many documents include written indications of one or more persons, for example the name of a person identified by a passport, driving license or identity card, or the name of a bank account holder. Many documents also include a place where written signature of a bearer or certifier is applied. Using a block-wise analysis of a signature obtained therefrom for validation can detect a modification to alter a name or other important word or number printed or written onto a document. A block which corresponds to the position of an altered printing or writing can be expected to produce a much lower quality match than blocks where no modification has taken place. Thus a modified name or written signature can be detected and the document failed in a validation test even if the overall match of the document is sufficiently high to obtain a pass result.

The area and elements selected for the scan area can depend upon a number of factors, including the element of the document which it is most likely that a fraudster would attempt to alter. For example, for any document including a photograph the most likely alteration target will usually be the photograph as this visually identifies the bearer. Thus a scan area for such a document might beneficially be selected to include a portion of the photograph. Another element which may be subjected to fraudulent modification is the bearer's signature, as it is easy for a person to pretend to have a name other than their own, but harder to copy another person's signature. Therefore for signed documents, particularly those not including a photograph, a scan area may beneficially include a portion of a signature on the document.

In the general case therefore, it can be seen that a test for authenticity of an article can comprise a test for a sufficiently high quality match between a verification signature and a record signature for the whole of the signature, and a sufficiently high match over at least selected blocks of the signatures. Thus regions important to the assessing the authenticity of an article can be selected as being critical to achieving a positive authenticity result.

In some examples, blocks other than those selected as critical blocks may be allowed to present a poor match result. Thus a document may be accepted as authentic despite being torn or otherwise damaged in parts, so long as the critical blocks provide a good match and the signature as a whole provides a good match.

Thus there have now been described a number of examples of a system, method and apparatus for identifying localised damage to an article, and for rejecting an inauthentic an article with localised damage or alteration in predetermined regions thereof. Damage or alteration in other regions may be ignored, thereby allowing the document to be recognised as authentic.

In some scanner apparatuses, it is also possible that it may be difficult to determine where a scanned region starts and finishes. Of the examples discussed above, this may be most problematic a processing line type system where the scanner may "see" more than the scan area for the article. One approach to addressing this difficulty would be to define the scan area as starting at the edge of the article. As the data received at the scan head will undergo a clear step change when an article is passed though what was previously free space, the data retrieved at the scan head can be used to determine where the scan starts.

In this example, the scan head is operational prior to the application of the article to the scanner. Thus initially the scan head receives data corresponding to the unoccupied space in front of the scan head. As the article is passed in front of the scan head, the data received by the scan head immediately changes to be data describing the article. Thus the data can be monitored to determine where the article starts and all data prior to that can be discarded. The position and length of the scan area relative to the article leading edge can be determined in a number of ways. The simplest is to make the scan area the entire length of the article, such that the end can be detected by the scan head again picking up data corresponding to free space. Another method is to start and/or stop the recorded data a predetermined number of scan readings from the leading edge. Assuming that the article always moves past the scan head at approximately the same speed, this would result in a consistent scan area. Another alternative is to use actual marks on the article to start and stop the scan region, although this may require more work, in terms of data processing, to determine which captured data corresponds to the scan area and which data can be discarded.

In some examples, a drive motor of the processing line may be fitted with a rotary encoder to provide the speed of the article. Alternatively, a linear encoder of some form may be used with respect to the moving surface of the line. This can be used to determine a start and stop position of the scan relative to a detected leading edge of the article. This can also be used to provide speed information for linearization of the data, as discussed above with reference to FIG. 8. The speed can be determined from the encoder periodically, such that the speed is checked once per day, once per hour, once per half hour etc.

In some examples the speed of the processing line can be determined from analysing the data output from the sensors. By knowing in advance the size of the article and by measuring the time which that article takes to pass the scanner, the average speed can be determined. This calculated speed can be used to both locate a scan area relative to the leading edge and to linearise the data, as discussed above with reference to FIG. 8.

Another method for addressing this type of situation is to use a marker or texture feature on the article to indicate the start and/or end of the scan area. This could be identified, for example using the pattern matching technique described above.

Thus there has now been described an number of techniques for scanning an item to gather data based on an intrinsic property of the article, compensating if necessary for damage to the article or non-linearities in the scanning process, and comparing the article to a stored signature based upon a previous scan of an article to determine whether the same article is present for both scans.

A further optional arrangement for the signature generation will now be described. The technique of this example uses a differential approach to extraction of the reflected signals from the photodetectors 16 (as illustrated in FIG. 1). In this approach, the photodetectors are handled in pairs. Thus if more than two photodetectors are used, some may be included in pairs for a differential approach and some may be considered individually or in a summing sense. The remainder of this example will refer to a situation where two photodetectors 16a and 16b are employed.

In the present example, the output from each photodetector 16 is fed to a separate ADC 31. The outputs of these two ADCs are then differenced (for example whereby the digitised signal from the second photodetector is subtracted from the digitised signal from the first photodetector) to provide the data set that is used for signature generation.

This technique is particularly applicable to situations where the outputs from the two photodetectors are substantially anticorrelated as the differencing then has the effect of up to doubling the signal strength. Examples of situations where a high level of anticorrelation occurs are surfaces with high levels of halftone printing.

Thus a variety of examples of systems for obtaining and using a biometric-type signature from an article have been described. Alternative scanner arrangements, and various applications and uses for such a system are set out in the various patent applications identified above. The use of the match result testing approaches disclosed herein with any of the physical scanner arrangements and/or the applications and uses of such technology disclosed in those other patent applications is contemplated by the inventor.

The invention claimed is:

1. Apparatus for determining a signature from an article arranged in a reading volume comprising:
   a generator operable to generate and sequentially direct a focussed noncoherent beam onto each of a plurality of different regions of the reading volume;
   a detector arrangement operable to collect a set comprising groups of data points,
   wherein each group of data points is collected from signals obtained when the beam scatters from the different regions of the reading volume, such that each of the different ones of the groups of data points relates to scatter from each of the respective different regions of the reading volume; and
   a data acquisition and processing module operable to determine a signature of the article from the set of groups of data points.

2. The apparatus of claim 1, wherein the generator comprises a structured source.

3. The apparatus of claim 2, wherein the structured source is an LED array.

4. The apparatus of claim 1, wherein the generator comprises an unstructured source.

5. The apparatus of claim 4, wherein the unstructured source is a thermal source.

6. The apparatus of claim 1, wherein the generator comprises an arrangement for collimating the noncoherent beam and subsequently focussing the collimated beam.

7. Apparatus for determining a signature from an article arranged in a reading volume comprising:
   a generator operable to generate and sequentially direct a focussed noncoherent beam onto each of a plurality of different regions of the reading volume, wherein the generator is operable to focus the beam to achieve an elongate focus into the reading volume;
   a detector arrangement operable to collect a set comprising groups of data points, wherein each group of data points is collected from signals obtained when the beam scatters from the different regions of the reading volume, such that each of the different ones of the groups of data points relates to scatter from each of the respective different regions of the reading volume; and
   a data acquisition and processing module operable to determine a signature of the article from the set of groups of data points.

8. The apparatus of claim 7, wherein the short dimension of the elongate focus is less than 100 μm.

9. The apparatus of claim 7, wherein the short dimension of the elongate focus is less than 50 μm.

10. The apparatus of claim 7, wherein the long dimension of the elongate focus is in the range 3 mm to 50 mm.

11. A method of determining a signature from an article arranged in a reading volume comprising:
    generating and sequentially directing, by a light generator, a focussed noncoherent beam onto each of a plurality of different regions of the reading volume;
    collecting, by a detector arrangement, a set comprising groups of data points, wherein each group of data points is collected from signals obtained when the beam scatters from the different regions of the reading volume, such that each of the different ones of the groups of data points relates to scatter from each of the respective different regions of the reading volume; and
    determining, by a data acquisition and processing module, a signature of the article from the set of groups of data points.

12. The method of claim 11, wherein the light generator comprises a structured source.

13. The method of claim 12, wherein the structured source comprises an LED array.

14. The method of claim 11, wherein the light generator comprises an unstructured source.

15. The method of claim 14, wherein the unstructured source comprises a thermal source.

16. The method of claim 11, further comprising collimating the noncoherent beam and subsequently focussing the collimated beam.

17. A method of determining a signature from an article arranged in a reading volume comprising:
    generating and sequentially directing, by a light generator, a noncoherent beam with an elongate focus onto each of a plurality of different regions of the reading volume;
    collecting, by a detector arrangement, a set comprising groups of data points, wherein each group of data points is collected from signals obtained when the beam scatters from the different regions of the reading volume, such that each of the different ones of the groups of data points relates to scatter from each of the respective different regions of the reading volume; and
    determining, by a data acquisition and processing module, a signature of the article from the set of groups of data points.

18. The method of claim 17, wherein the short dimension of the elongate focus is less than 100 μm.

19. The method of claim 17, wherein the short dimension of the elongate focus is less than 50 μm.

20. The method of claims 17, wherein the long dimension of the elongate focus is in the range 3 mm to 50 mm.

21. Apparatus for determining a signature from an article arranged in a reading volume comprising:
    a generator comprising:
    an emitter configured to generate a noncoherent beam,
    a focusing element configured to focus the noncoherent beam, and
    a transport configured to sequentially direct the focussed noncoherent beam onto each of a plurality of different regions of the reading volume at an angle of incidence;
    a detector arrangement comprising:
    a plurality of a detector elements angularly distributed with respect to the angle of incidence of the focussed noncoherent beam toward the reading volume and configured to collect a set comprising groups of data points, wherein each group of datapoints is collected by a respective detector element from signals obtained when the beam scatters from the different regions of the reading volume, such that each of the different ones of the groups of data points relates to scatter from each of the respective different regions of the reading volume; and
    a data acquisition and processing module configured to process the set of groups of data points to create a digital signature of the article.

* * * * *